US012596042B2

(12) United States Patent
Peuchert et al.

(10) Patent No.: US 12,596,042 B2
(45) Date of Patent: Apr. 7, 2026

(54) GLASS WAFER AND GLASS ELEMENT FOR PRESSURE SENSORS

(71) Applicant: SCHOTT AG, Mainz (DE)

(72) Inventors: Ulrich Peuchert, Bodenheim (DE); Martin Blezinger, Mainz (DE); Thomas Utz, Darmstadt (DE); Christian Breitbach, Darmstadt (DE); Matthias Jotz, Mainz (DE); Sören Liebsch, Erfurt (DE)

(73) Assignee: SCHOTT AG, Mainz (DE)

( * ) Notice: Subject to any disclaimer, the term of this patent is extended or adjusted under 35 U.S.C. 154(b) by 433 days.

(21) Appl. No.: 18/155,196

(22) Filed: Jan. 17, 2023

(65) Prior Publication Data

US 2023/0175906 A1 Jun. 8, 2023

Related U.S. Application Data

(63) Continuation of application No. PCT/EP2021/069695, filed on Jul. 15, 2021.

(30) Foreign Application Priority Data

Jul. 17, 2020 (DE) .................... 10 2020 118 939.7

(51) Int. Cl.
*G01L 9/00* (2006.01)
*C03C 3/091* (2006.01)
*B23K 103/00* (2006.01)

(52) U.S. Cl.
CPC ............ *G01L 9/0042* (2013.01); *C03C 3/091* (2013.01); *B23K 2103/54* (2018.08)

(58) Field of Classification Search
CPC .......................... G01L 9/0042; B23K 2103/54
See application file for complete search history.

(56) References Cited

U.S. PATENT DOCUMENTS 9,470,593 B2 10/2016 Davis
2005/0172724 A1* 8/2005 Sakai .................... G01L 9/0054
73/754

(Continued)

FOREIGN PATENT DOCUMENTS

CN 107006128 A 8/2017
DE 102016213878 11/2017

(Continued)

OTHER PUBLICATIONS

English translation of International Preliminary Report on Patentability dated Jan. 17, 2023 for International Patent Application PCT/EP2021/069695, 8 pages.

(Continued)

*Primary Examiner* — Nathaniel J Kolb
(74) *Attorney, Agent, or Firm* — Ruggiero McAllister & McMahon LLC; Edward L McMahon

(57) ABSTRACT

A glass wafer is provided that includes a sheetlike glass substrate with an opening. The sheetlike glass substrate is configured for use in a sensor selected from a group consisting of a pressure sensor, a piezoresistive sensor, a capacitive pressure sensor, and a piezoresistive pressure sensor. The opening is defined in the glass substrate from a first surface to a second, opposite surface. The opening has a cross-sectional area that is delimited by a straight portion having a minimum length of at least 10 μm and a side face with a surface characterized by a skewness (Ssk) of at most 5.0.

20 Claims, 10 Drawing Sheets

(56) References Cited

U.S. PATENT DOCUMENTS

| | | | |
|---|---|---|---|
| 2005/0252298 A1 | 11/2005 | Obermeier | |
| 2006/0288793 A1 | 12/2006 | Tanaka | |
| 2009/0096040 A1 | 4/2009 | Morales | |
| 2011/0000304 A1 | 1/2011 | Tojo | |
| 2013/0089754 A1 | 4/2013 | Nishimori | |
| 2015/0261261 A1 | 9/2015 | Bhagavatula | |
| 2015/0276533 A1* | 10/2015 | Belov | G01L 9/0042 |
| | | | 324/252 |
| 2017/0256422 A1 | 9/2017 | Ambrosius | |
| 2018/0035548 A1 | 2/2018 | Landesberger | |
| 2018/0215647 A1* | 8/2018 | Ortner | C03C 23/0025 |
| 2021/0347637 A1 | 11/2021 | Ostholt | |

FOREIGN PATENT DOCUMENTS

| | | |
|---|---|---|
| JP | S57128074 | 8/1982 |
| JP | H09126924 | 5/1997 |
| WO | 2020030222 | 2/2020 |

OTHER PUBLICATIONS

DIN EN ISO 25178-2, "Geometrical product specifications (GPS)—Surface texture: Areal—Part 2: Terms, definitions and surface texture parameters", Sep. 2023, 76 pages.

English translation of International Search Report dated Oct. 21, 2021 for International Patent Application PCT/EP2021/069695.

English translation of Written Opinion of the International Searching Authority dated Oct. 21, 2021 for International Patent Application PCT/EP2021/069695.

* cited by examiner view from above view from below

GLASS WAFER AND GLASS ELEMENT FOR PRESSURE SENSORS

CROSS REFERENCE TO RELATED APPLICATIONS

This application is a continuation of International Application PCT/EP2021/069695 filed Jul. 15, 2021, which claims the benefit under 35 USC § 119 of German Application 10 2020 118 939.7 filed Jul. 17, 2020, the entire contents of both of which are incorporated herein by reference.

BACKGROUND

1. Field of the Invention

The invention relates generally to a glass wafer for producing glass elements for use in pressure sensors, such as in piezoresistive or capacitive pressure sensors, preferably in piezoresistive pressure sensors, and to a glass element for use in pressure sensors, and also to a process for producing such a glass element and a glass wafer. A further aspect relates to a pressure sensor which comprises such a glass element or is obtainable by means of such a glass element.

2. Description of Related Art

Microelectromechanical (or MEMS) pressure sensors comprise a thin membrane of silicon which is elastically deformable by pressure. This silicon membrane is generally applied on a pedestal composed of an insulator or a semiconducting material such as silicon. The pedestal has an opening through which a fluid, such as a gas or liquid, can penetrate the measuring cavity of the pressure sensor. The membrane is acted on by pressures from both sides: a reference pressure on one side, and a variable pressure on the side of the membrane that faces the measuring cavity; the reference pressure may be either fixed or variable. Where the pressures on the two sides of the membrane differ from one another, the membrane undergoes deformation. Incorporated in the membrane are precision resistors which change their resistance on deformation (known as piezoresistive resistors). They are arranged electrically in the form of a Wheatstone bridge circuit. Deformation of the membrane is accompanied by a change in the electrical voltage of the bridge circuit. This measurable change in the bridge voltage is approximately proportional to the pressure difference.

Alternatively, pressure differences may also be measured capacitively. In this case, rather than resistors, there are micromechanical structures incorporated in the silicon for the measurement of capacities—i.e., capacitor functionalities.

The pedestal material used for a pressure sensor of this kind may be, for example, an insulating material such as glass or a semiconducting material such as silicon. In order to reduce component size, the pedestal elements used are thin as far as possible, having a thickness of less than 1 mm, in the range for example between 200 μm and 900 μm, more particularly of, for example, 800 μm or 400 μm. In order to ensure extremely effective thermal decoupling of the MEMS component from the carrier material, however, thicker pedestals may also be required. They may be up to 3.5 mm thick.

The precise configuration of the opening made in the pedestal material is variable. These openings in general have a round cross section, and the size of the cross-sectional opening may be varied over the thickness of the pedestal material. It is possible, for example, for the cross-sectional opening to have a frustoconical shape, in other words for the walls of the opening, with a round cross-sectional shape, to be inclined relative to one another. Frustapyamidal shapes of the opening are also known.

Japanese Patent Application JP S57-128074 A describes a pressure sensor wherein the pedestal material is formed of a single crystal of silicon with a particular crystallographic orientation. The opening in the pedestal is obtained by anisotropic etching of the single crystal. Depending on the precise orientation of the monocrystalline pedestal material, it is possible to obtain different opening geometries, and so openings with an angular cross-sectional area are possible as well as openings with a round cross section.

U.S.-American Patent Application US 2011/0000304 A1 describes a pressure sensor comprising a glass pedestal, where the opening in the glass pedestal has different diameters, specifically such that the diameter of the opening in the direction of the silicon membrane is greater than the diameter of the opening which faces a metallic pedestal. A process for generating different diameters in the glass material is not described.

U.S.-American Patent Application US 2006/0288793 A1 describes a pressure sensor comprising a pressure transfer gel, in which, in the glass pedestal the pressure sensor includes, there is a defined ratio between the thickness of the glass pedestal and of the opening made in the glass pedestal. The purpose of this is to prevent deformations of the silicon membrane by the gel, as may be brought about in particular, by the expansion of the gel under fluctuating temperatures, by providing for a sufficient opening diameter and at the same time obtaining only a small thickness of the glass pedestal.

U.S.-American Patent Application US 2005/0172724 A1 describes a pressure sensor with a glass pedestal. The glass pedestal comprises an opening having a size that varies over the thickness of the glass pedestal. The opening may have the shape, for example, of a conical frustum or of a pyramidal frustum. The side of glass pedestal facing away from the pressure sensor membrane has a smaller opening size than the opening on the side of the glass pedestal that is oriented toward the silicon membrane. The reason for this is that in this way the intention is to prevent or at least minimize the entry of impurities into the measuring cavity and therefore any distortion of the pressure measurement. The opening may be made in the glass pedestal by means of UVL (ultrasonic vibration lapping).

An opening size in the glass pedestal that varies over the thickness of the glass pedestal is also described by Japanese Patent Application JP H09-126924 A. The opening in this case is generated by an etching operation. On the side of the glass pedestal facing away from the silicon membrane, the size of the opening is larger than on the glass pedestal side facing the silicon membrane. The purpose of this is to improve the mechanical stability of the opening in the glass pedestal, with no breakout of the opening margin in the glass pedestal on the side facing away from the silicon membrane.

U.S. Pat. No. 9,470,593 B2 describes a pressure sensor wherein the cover or cap may be formed of glass and has an opening, the opening having any desired shape and size to allow fluid to pass through the opening to the wafer.

Furthermore, U.S.-American Patent Application US 2009/0096040 A1 describes a sensor having an optimized sensor geometry.

From the prior art, therefore, there are very different configurations known for pedestals for pressure sensor applications. In this context it has emerged that the precise configuration of the opening in the pedestal has a substantial influence over the mechanical stability and/or reliability of the pressure sensor. For example, a particular part, in relation for example to wettability and/or coatability, is played by the size of the opening, the angle of inclination of the sidewalls or side face, and the configuration of the surface of these sidewalls or side face. Establishing the surface properties of the side face or sidewalls of the glass pedestal in a targeted way, such as in a preferably highly reproducible process, for example, preferably in combination with the geometric configuration of the opening in the wafer plane or sheet plane, in the form, for example, where at least one edge of the opening has portions at least that are linear in form, may make a decisive contribution here to improving known pressure sensors.

There is therefore a demand for glass elements and glass wafers for the production of glass elements for pressure sensors that at least diminish known weaknesses of the prior art.

SUMMARY

The object on which the present invention is based is therefore that of providing a glass wafer and, respectively, a glass element for use in a pressure sensor, which further improves the mechanical stability and/or the reliability of a pressure sensor. Further aspects relate to a process for producing a glass element, and a pressure sensor which comprises such a glass element.

Improving the stability and/or the reliability of a pressure sensor here may entail improving the mechanical stability and hence, for example, the lifetime of a pressure sensor, but also embraces, generally, other aspects, such as the homogeneity and/or stability of a signal generated by the sensor.

The present disclosure therefore relates to a glass wafer for producing a framelike glass element for use in pressure sensors, such as piezoresistive or capacitive pressure sensors, for example, preferably in piezoresistive pressure sensors, comprising a sheetlike glass substrate and also at least one opening which reaches from one surface of the sheetlike glass substrate to the other surface of the sheetlike glass substrate, where the opening has a cross section with a cross-sectional area, the cross-sectional area being delimited by at least one straight portion, preferably having a minimum length of at least 10 µm, preferably at least 20 µm and more preferably at least 100 µm, where the opening has a side face which has a surface which is preferably characterized by a skewness Ssk, determined according to the following formula $$Ssk = \frac{1}{S_q^3}\left[\frac{1}{A}\int\int_A (Z(x,\ y)^3)dxdy\right] \qquad (1)$$

of other than 0, where the amount of the skewness Ssk is preferably at least 0.001 and more preferably at most 5, where more preferably the skewness is determined in a planar region of the side face, preferably in a region which corresponds to the straight portion.

In the formula above, $S_q$ denotes the mean square roughness of the surface, or the RMS value. A denotes the area of the integration zone for which the skewness is determined, $Z(x,y)$ denotes the respective height value of the surface profile at the coordinates x, y. This height value is expressed relative to the arithmetic mean of the height values of the surface profile. If, therefore, a point on the surface profile is higher than the mean, the associated value $Z(x,y)$ is positive; if the point is below the mean, $Z(x,y)$ is negative. In the case of a practical measurement on a surface, it is possible, rather than calculating the integral, to perform a determination of the surface profile at discrete points. The integral may then be replaced by a sum, and the area by the number of summands, or measurement points. The Ssk is then given by:

$$Ssk = \frac{1}{m}\sum_{i=1}^{m}\frac{Z(x,\ y)^3}{S_q^3} \qquad (2)$$

The skewness is preferably determined by means of white light interferometry (abbreviated WLi). A measurement of this kind may be carried out, for example, with a white light interferometer from Zygo, such as the ZYGO NewView interferometer. The data are recorded and analyzed using the ZYGO Mx™ software at appropriate magnifications (20-time magnification by lens and also 0.5-times zoom). To increase the accuracy of the analyses, the software restricts the area under analysis (referred to as the mask), allowing the unmeasurable areas to be segregated. Here, as and when required, a rectangular measurement region with dimensions of 740 µm*320 µm or 740 µm*520 µm is selected. The Ssk values are determined in this case according to the following formula, or according to formula (1) above:

$$Ssk = \frac{1}{S_q^3}\left[\frac{1}{A}\int\int_A (Z(x,\ y)^3)dxdy\right]$$

The value $S_q$ may be calculated according to the following equation:

$$S_q = \sqrt{\frac{1}{A}\int\int_A Z^2(x,\ y)dxdy} \qquad (3)$$

The value in question is therefore the square mean of the height. For its determination as well, it is possible, rather than an integration, to perform a calculation with a number of discrete measurement points by means of a sum:

$$S_q = \sqrt{\frac{1}{m}\sum_{i=1}^{m}Z(x,\ y)^2} \qquad (4)$$

The amount of the skewness is preferably at least 0.002, more preferably at least 0.003, very preferably at least 0.004, and especially preferably at least 0.01.

According to one preferred embodiment, the amount of the skewness is at most 2.0, more preferably at most 1.5.

More particularly, the amount of the skewness may be between 0.003 and 5, preferably between 0.004 and 2.0, more preferably between 0.01 and 1.5.

The skewness according to one embodiment may more particularly be greater than 0. In this case, the surface is formed as a surface characterized predominantly by elevations. The surface with bulges in arrays may promote the flow of the fluid past the surface, since the notched configuration establishes a turbulent boundary layer at the perforated wall. This acts like a local increase in fluid viscosity and promotes the bordering laminar flows.

The skewness in this case is preferably 0.001 and preferably at most 5. The skewness here is preferably at least 0.002, more particularly at least 0.003, preferably at least 0.004, and very preferably at least 0.01. With further preference the skewness is at most 2.0, preferably at most 1.5.

Preferred ranges for the skewness here are between at least 0.003 and at most 5, more particularly at least 0.004 and at most 2.0, very preferably between 0.01 and 1.5.

According to a further embodiment, the skewness can be less than 0. In that case the surface is characterized predominantly by depressions. The surface in this case is free from narrow depressions, which may also be termed notches. As a result, particularly in the case of loading with subjection to pressure, there is a reduced notching effect, which increases the component strength.

In this case the skewness is preferably at most −0.001 and more preferably at least −5. The skewness here is preferably at most −0.002, more particularly at most −0.003, preferably at most −0.004, and very preferably at most −0.01. With further preference the skewness is at least −2, preferably at least −1.5.

Preferred ranges for the skewness here are between at most −0.003 and at least −5, more particularly at most −0.004 and at least −2.0, more preferably between −0.01 and −1.5.

In the context of the present disclosure, the following definitions of terms apply:

a glass substrate is understood in the context of the present disclosure to be a product of or comprising a vitreous material. A vitreous material is understood, generally, to be an inorganic, amorphous material, which is melted from a batch in a melting operation in particular. The melting operation may be followed by an operation referred to as hot shaping, to give, for example, a plate or sheet of or comprising a vitreous material (i.e., for example, a glass plate or glass sheet). Hotshaping operations known to the skilled person include, for example, drawing, rolling or floating. A glass substrate in the sense of the present disclosure may therefore take the form of, for example, a glass sheet or glass plate. In particular, in the context of this disclosure, the vitreous material may be what is known as a borosilicate glass or may comprise such a glass.

A planar region of a surface or, more generally, area/face is understood here to be a region of a surface or, more generally, area/face that is not curved. The planar region, however, may in particular be configured such that it has a roughness. This means that a planar region in the sense of the present disclosure is not understood to be ideally flat or smooth. Instead, in particular, a planar region in the sense of the present disclosure may be a region which is delimited by at least one straight portion.

The glass substrate is preferably transparent in form, with transparency here relating to electromagnetic radiation in the wavelength range from 380 nm to 780 nm, in other words in the visible light range.

The glass substrate may in particular be sheetlike in form. This means that the lateral dimension of the glass substrate in a first direction of a cartesian coordinate system (which may also be understood as the thickness of the glass element) is at most one fifth of the lateral dimensions in the two other directions, perpendicular to the first direction, in the cartesian coordinate system (these directions may also be referred to as the length and width of the glass element). In other words, the thickness of the glass substrate is at most one fifth of its length/width. Embodiments in which the length and width of the glass substrate are significantly more than five times the thickness are likewise possible. In that case the glass substrate takes the form of a very long and wide, thin sheet: for example, a thin-glass sheet or thin-glass strip. A strip in the context of the present specification is a shaped body whose length is significantly greater, such as an order of magnitude greater, than the width. Where length and width are in the same order of magnitude, the body is generally referred to as a sheet. If the glass substrate is circular in form, the diameter of the glass substrate replaces length and width.

The statement of the lateral dimensions here is based on the distance between the surfaces delimiting the glass substrate. In other words, the glass substrate is a shaped body made of or comprising a vitreous material. Where the present disclosure refers to surfaces of the glass substrate and, correspondingly, to surfaces of a glass wafer or glass element, the surfaces in question, unless expressly observed otherwise, are the faces which together make up more than 50% of the total surface area of the shaped body. In the case of a sheetlike form of the glass substrate, these surfaces, which may also be denoted as main faces, are the faces defined by the length and width of the glass substrate, or, in the case of a circular or elliptical formation of the glass element, the two circle faces or the two ellipses, respectively. The main faces of the glass substrate may also be termed sides. Depending on the precise disposition of the glass substrate or else, correspondingly, of the glass wafer or glass element, they may also be referred to as top side and bottom side when the glass substrate (or wafer or glass element) is horizontal, or as front side and back side when it is vertical.

In general the surfaces of the glass substrate are disposed substantially parallel to one another, meaning that the glass substrate may also be described in geometric terms as a thin, possibly elongated cuboid or as a thin circular cylinder or, generally, as a thin prism of arbitrary base area. A substantially parallel disposition of the surfaces means that the surfaces include with one another an angle of at most 5° and are preferably disposed parallel to one another within the bounds of customary manufacturing tolerances.

A glass wafer (or glass element wafer) refers to a shaped body which comprises a glass substrate and also at least one opening. In other words, the glass substrate may be understood as a glass sheet without an opening, and a glass wafer as a glass sheet comprising multiple openings. A glass element in the sense of the present disclosure generally comprises only one opening and is smaller than a glass wafer; in particular, the glass element may result from singulation of a glass wafer. Where reference is made presently to surfaces of a glass element or glass wafer, it is self-evident that these are the surfaces of the glass substrate comprised of glass wafer. The thicknesses of the glass substrate, of the glass wafer which comprises the glass substrate and of the glass element obtained from the glass wafer by singulation are the same, correspondingly, as well. The same is also true correspondingly of the chemical composition of the vitreous material of glass substrate, glass element and glass wafer.

An opening extending from one surface of the glass element (or glass wafer) to the other surface of the glass element (or glass wafer) is understood in the context of the present disclosure to be an aperture in the glass element or glass wafer or glass substrate, respectively. In other words, there is no vitreous material in the region of the opening. The opening may therefore be termed a channel or hole. Therefore, a glass element comprising such an opening is framelike in form. This means that the vitreous material encloses or surrounds the opening. A framelike glass element is also understood presently to mean in particular that the framelike glass element comprises exactly one opening.

The opening may be described geometrically as a hollow body having one or possibly two base area or areas, corresponding to the cross section of the opening at the respective sides of the glass element or glass wafer, and having a height which corresponds to the thickness of the glass element/ glass wafer. The base areas of the opening are also referred to as cross-sectional areas. Where the two base areas are the same size, the opening may also be said to have a cross-sectional area. Where the reference is to the size of the cross-sectional area, it is possible generally to state the mean of the cross-sectional areas in the case where the size of the cross-sectional area of the opening varies over the height. The opening may be described, generally, as a hollow body in the shape of a prism or cone or, for the case of a size of the cross-sectional area that varies over the height of the opening, as a pyramidal frustum, or conical frustum in the case where the size of the cross-sectional area increases continuously in a direction from one surface of the glass element. Theoretically it is also possible for the shape of the cross-sectional area to evolve. From the standpoint of operational and manufacturing technology, however, it is preferable for the shape of the cross-sectional area to stay the same and for only the size to be able to vary.

The opening is also delimited by a side face, namely by the wall of the opening that is formed by the vitreous material of the glass element/substrate. In the case of the opening being configured as a prism, the side face corresponds to the lateral surface of a prism, or, depending on precise configuration, to a lateral surface of a pyramidal frustum, a lateral cone surface, or a lateral surface of a conical frustum. More complex geometric configurations of the side face are conceivable, but for reasons of operational and manufacturing technology are not preferred.

The cross-sectional area may generally, in principle, have any desired shape, and, for example, configurations of a round cross-sectional area are conceivable in principle. In the context of the present disclosure, however, it is advantageous for the cross-sectional area to be in such a form that it is delimited by a straight portion, preferably having a minimum length of at least 10 μm, preferably at least 20 μm or even and particularly preferably at least 100 μm. A configuration of this kind may be advantageous specifically for the use of the glass element in pressure sensors. The reason is that it has emerged that in this way, i.e., in particular, when the shape of the membrane, preferably ideally, is formed according to the underlying opening, pressure spikes are avoided in the measuring cavity of a pressure sensor and hence there is a more uniform loading of the silicon membrane, more particularly a more uniform loading of the silicon membrane over time. In other words, temporal pressure fluctuations can at least be reduced by a configuration of this kind for the cross-sectional area. Such reduction in pressure fluctuations over time may have the advantageous effect of increasing the lifetime of a pressure sensor equipped with such a glass element, owing to the reduced mechanical loading of the silicon membrane. In principle, therefore, the utilization of a nonround cross-sectional element of a design of an opening provides the possibility of advantageously designing oscillation modes at the membrane, i.e., of controlling position and intensity of oscillations. Even very small straight portions may make contributions here: the minimum length of a straight portion is at least 10 μm, preferably at least 20 μm. Ideally, indeed, at least 100 μm lengths are possible, with the length being preferably at most 2 mm, more preferably not more than 1.7 mm.

In particular it has emerged that an opening with a nonround cross-sectional area, such as with an angular cross-sectional area, for example, has advantages, including when the utility in question is that of the glass element or glass wafer in a pressure sensor. Generally, indeed, the measuring cavities in the silicon membranes of such pressure sensors, such as capacitive or piezoresistive pressure sensors, for example, are likewise usually angular, frequently square, in construction. In terms of its cross section, the measuring cavity here is larger than the opening in the glass element. It is found that with an angular opening, more particularly an opening having a cross section similar to that of the cavity, in other words, for example, having a corresponding shape, the load per unit area resulting from subjection to pressure is lower. This is advantageous because in this way the load on the bonded interfaces between the silicon membrane and the glass element is lower, and so these do not undergo delamination as easily. In other words, pressure sensors of this kind have a higher bursting pressure stability, and can therefore be used at higher pressures.

In this regard, the following relationships have emerged in calculations.

The larger the resulting free area of the glass element under the silicon membrane, in other words the greater the extent to which there is glass area in the measuring cavity that is not bonded to the silicon membrane, the smaller the difference between an opening having a round cross section and a nonround cross section, in other words a cross section having a cross-sectional area which has at least one straight portion. This means, conversely, that with small resultant free areas in particular, a straight portion of the cross-sectional area or an angular design of the cross-sectional area are particularly important.

The larger the resultant free area, the greater the load per unit area results on subjection to pressure, and hence the greater the effective force.

The greater the pressure applied in the sensor, the better it is to have only a small resultant free area. The reason is that it reduces the loading on the bonded interfaces.

A general rule is that in the case of a change of the cross-sectional geometry from round to angular, i.e., on a change from a round cross-sectional area having a diameter x to an at least approximately square cross-sectional area having an edge length x, which corresponds to the diameter x of the round cross-sectional area, the resulting free area is about 27% smaller. With small resultant free areas in particular, this has significant consequences for the effective force.

This is relevant in particular for high-pressure applications, in other words for pressure sensors rated for a pressure of at least 30 bar or more.

The resultant free area (or resultant area) referred to above is given by the difference between the lateral dimension or dimensions of the cavity and that/those of the opening in the glass element.

This is shown by the example calculation in the table below. The calculation example used here was a square cavity with an edge length of 1.18 mm.

| | Lateral dimension mm | Cross-sectional area mm² | Resultant free area mm² | Pressure N/mm² | Force N |
|---|---|---|---|---|---|
| Cavity□ | 1.18 | 1.39 | | 2 | |
| Cavity − opening distance | 0.20 | | | | |
| Opening Ø | 0.78 | 0.48 | 0.91 | | 1.8 |
| Opening □ | 0.78 | 0.61 | 0.78 | | 1.6 |
| | | Diff. | 27% | | −14% |
| Area ratio cavity/opening Ø | | | ~2.91 | | |
| Area ratio cavity/opening □ | | | ~2.29 | | |

For this case of a square cavity, then, with a likewise square cross-sectional area of the opening in the glass element, the effective force is 14% lower than for the case of a round cross-sectional area. This advantageous quality makes a particular difference in the case of small resultant free areas and/or else, in particular, in the case where the ratio of the cross-sectional area of the cavity to the cross-sectional area of the opening is small, i.e., for example, less than 10 or less than 5.

Calculated for this purpose in the table above were the corresponding area ratios of cavity/opening Ø (for the round opening) and cavity/opening □ (for the angular, in this case, indeed square, opening). With the small ratios of the areas to one another that are obtained, the result for the case of a nonround opening here, as observed, is a difference in the effective force in the two-digit percentage range.

This is less pronounced in the case of larger area ratios.

This may be observed, illustratively, from the data set out in the table below:

| | Lateral dimension mm | Cross-sectional area mm² | Resultant free area mm² | Pressure N/mm² | Force N |
|---|---|---|---|---|---|
| Cavity □ | 2.5 | 6.25 | | 1 | |
| Cavity − opening distance | 1.00 | | | | |
| Opening Ø | 0.5 | 0.20 | 6.05 | | 6.1 |
| Opening □ | 0.5 | 0.25 | 6.00 | | 6.0 |
| | | Diff. | 27% | | −1% |
| Area ratio cavity/opening Ø | | | ~31.8 | | |
| Area ratio cavity/opening □ | | | ~25 | | |

In the example above, therefore, the advantage of an angular rather than a round cross-sectional area is no longer so greatly pronounced; instead, with this resultant free area which is larger overall and is in each case around 6 mm², there is only a small difference in the effective force.

In other words it is the case that the effect in the case of a change from a round geometry to a nonround geometry of the cross-sectional area is particularly good when the ratio of the cross-sectional area of the cavity to the cross-sectional area of the opening is small, specifically, preferably, less than 10, more particularly less than 5. In the first of the two tables above, the effect is particularly strongly pronounced: here, indeed, the ratio of the cross-sectional areas of cavity and opening to one another is less than 3.

A formation, preferably optimum, of the shape of the membrane according to the underlying opening is understood in the context of the present disclosure to mean that the shape of the membrane corresponds to the shape of the opening insofar as the side ratios of membrane and opening are substantially the same. Side ratios substantially the same mean here that the membrane and the opening may have a size of the cross-sectional area deviating from one another and/or that the corner radius of membrane and opening may possibly deviate. According to this embodiment, however, apart from these deviations, the cross-sectional area shape of the opening corresponds to the shape of the membrane. According to one embodiment of the glass wafer, the shape of the membrane, such as a silicon membrane, for example, is formed according to the underlying opening, and so the shape of the membrane, such as of the silicon membrane, for example, corresponds to the shape of the opening insofar as the side ratios of membrane, more particularly silicon membrane, and opening are the same.

It may be particularly advantageous if the cross-sectional area is delimited by two or more straight portions, as for example by four straight portions. The cross-sectional area may more particularly take the form of a polygon. The cross-sectional area is preferably rectangular or square in form. In this way, within the measuring cavity of a pressure sensor equipped with such a glass element, a particularly uniform pressure distribution is possible. Here as well, a polygonal—for example rectangular or square—configuration of the cross-sectional area means that the corners of such a polygon are rounded or at least may be rounded.

It has emerged, furthermore, that it is advantageous if the side face has a surface which is preferably characterized by a skewness Ssk, determined according to the following formula $$Ssk = \frac{1}{S_q^3}\left[\frac{1}{A}\int\int_A (Z(x, y)^3) dxdy\right]$$

of other than 0, the amount of the skewness Ssk being preferably at least 0.001 and more preferably at most 5, where preferably the amount of the skewness is at least 0.002, more preferably at least 0.003, very preferably at least 0.004 and especially preferably at least 0.01, and/or the amount of the skewness is at most 2.0, more preferably at most 1.5, where $S_q$ denotes the mean square roughness of the surface, or the RMS value, A is the area of the integration zone of which the skewness is determined, Z(x,y) is the respective height value of the surface profile at the coordinates x, y, this height value being expressed relative to the arithmetic mean of the height values of the surface profile, and where the associated value Z(x,y) is positive if a point on the surface profile is higher than the mean, and negative if the point is below the mean.

The skewness is determined preferably in a planar region of the side face, preferably in a region which corresponds to the straight portion. The region corresponding to the straight portion may be identical or partly identical to the planar region of the side face. Depending on the precise configuration of the opening, for example, it is also possible for the region which corresponds to the straight portion to be understood as a subregion of the planar region of the side face. In the case of a configuration of the opening, for example, with a cross section whose cross-sectional shape corresponds to a rectangle, such as a rectangle with rounded corners, for example, the planar region of the side face is formed by four rectangles, which may also be understood as the lateral surface of a prism. The skewness here is determined in particular in one of these rectangles of the lateral surface, and these rectangles may each also be assigned to a straight portion of the cross-sectional area of the opening.

In other words, according to the present disclosure, a surface or a region of the surface of an opening is preferably produced in a glass element, said surface or surface region having a nonsymmetrical or nonuniform distribution of elevations/depressions. This may be advantageous in particular for the use of a framelike glass element, produced from a glass wafer according to embodiments of the present disclosure, in a pressure sensor. The reason is that through the nonsymmetrical and/or nonuniform distribution of elevations and/or, optionally, depressions, it is possible to generate, or targetedly influence, the distribution of turbulent and laminar flow components of fluids, such as liquids and gases, toward—for example—a functional silicon MEMS membrane.

Hence a defined design of the surface in at least one region may both increase and reduce the flow resistance of the opening.

Structures longitudinal to the flow direction have the potential—in analogy to the biological example of shark skin—to reduce the flow resistance significantly. A surface of this kind offers the potential for improving the dynamic response of the sensor.

Structures transverse to the flow direction, or irregular structures, increase the flow resistance. In the case of an external pressure pulse on the sensor, a surface thus designed means that fluid is able to flow only slowly into the sensor cavity (or measuring cavity), with the sensor membrane consequently being loaded less abruptly than with an unstructured surface.

The same effect occurs if the pressure on the sensor is suddenly reduced—in the case of a surface structured transverse to the flow direction, the medium escapes slowly from the cavity and the dynamic load on the sensor is reduced relative to an unstructured surface.

Through both effects in combination it is possible accordingly to tailor the attenuation of the oscillatable cavity-sensor membrane system, in order, for example, to deliberately shift natural oscillations of the system, to increase the lifetime of the sensor, or to achieve particularly high signal quality in defined frequency ranges.

Likewise conceivable is an asymmetrical structuring of the wall surface, which implies a high flow resistance in one direction but a significantly lower resistance in the other direction.

As well as the movement of fluid into the cavity as a result of movement of the membrane, wave phenomena as a result of the compressibility of the medium should also not be disregarded:

In the case of impulse-like loads, a compression or dilution wave passes through the opening onto the sensor membrane. This wave is reflected within the cavity and so leads to a high-frequency loading of the sensor membrane, the amplitude of which is in the same order of magnitude as the pressure jump itself.

A targeted structuring of the surface of the opening has the advantage here that this wave is diffusely reflected within the opening itself, comparable with diffuse reflectors in sound studios or concert halls, causing the pressure increase at the sensor membrane itself to be less impulsive.

It is advantageous in this case for there to be a minimum skewness, with the surface of the side face in at least one region thus having, in a targeted way, an uneven distribution of heights and depths. It may, however, be advantageous if the distribution is not too sharply tilted, since otherwise it is possible that unfavorable flow components may come to predominate.

The manifestation of surface morphology of the sidewall or side face of the opening may be adjusted in a targeted way via operating parameters when producing the opening or openings.

According to one embodiment, the surface is designed in a form such that it predominantly has depressions ("valleys"). In this case the skewness is less than 0. According to another embodiment, there may also predominantly be "hills"; correspondingly, the Ssk in that case is greater than 0.

In the formula above $S_q$ denotes the square mean (root mean square) of the height, which is calculated according to the following formula:

$$ Sq = \sqrt{\frac{1}{A} \int \int_A Z^2(x,\, y)\, dx\, dy} $$

A is the area of the measuring range, x and y are the area coordinates of the range under consideration (measuring range), and z indicates the height. The skewness (or slant) Ssk indicates the degree of symmetry in the distribution of the surface heights around the mean height. It may therefore be interpreted as a measure of whether "valleys" or depressions or else elevations are more dominant in a surface topography. Where elevations and depressions are distributed equally, the skewness adopts a value of 0. For the case of a surface which has predominantly depressions, Ssk adopts a negative value. Where heights are predominant, the Ssk is positive, thus having a value of more than 0. The skewness is preferably determined within a measured area of more than 0.1 mm$^2$ and less than 3 mm$^2$.

The present invention refers to topology of inside surfaces of side faces of openings, with this particular topology being present preferably in at least one region of the surface of the side face, preferably in a region which is assigned to at least one straight portion of the cross-sectional area, coming about as a result of structuring operations. Structuring techniques are diverse, as are the parameters used for these techniques. The inside surfaces are required to have different characteristics according to uses.

The surface of the side face of the opening that is obtained presently is preferably a surface which is characterized predominantly by depressions, in some cases also elevations, including, in particular, dome-shaped, i.e., hemispherical, depressions or elevations. Surprisingly it has emerged that the establishment of such a surface leads to an improved mechanical stability on the part of the glass element. It is thought that this can be attributed to the fact that in or on the side face of the opening, according to the present disclosure, it is possible to obtain a particularly favorable bonding state at the surface, this bonding state being obtainable, for example, by substantially chemical ablation of the surface. This means, in other words, that the surface of the side face is distinguished by the fact that, specifically, weak, chemically attackable bonds of the glass network have been broken, whereas strong bonds initially still remain and therefore as a result lead to overall good mechanical stability on the part of the glass element. In particular, the occurrence of instances of chipping of the opening can be at least reduced in this way.

The manifestation of the domelike inner wall structures can be tailored via operational parameters. In the case of an illustrative use of a framelike glass element in a pressure sensor, it has emerged that a nonsymmetrical/nonuniform distribution of hills and valleys can have fluidic advantages, for example, in the distribution of turbulent and laminar flow components of liquids and gases toward a functional Si MEMS membrane. As observed above, through a tailored inner wall structure of an opening, it is also possible, possibly, to generate signal boosts in particular frequency ranges. It might also be the case that in this way particular frequency ranges can at least be suppressed, possibly resulting in reduced signal noise.

According to one embodiment, the cross-sectional area is delimited by at least two straight portions, the straight portions forming a corner with a radius curvature of at least 10 µm, preferably at least 20 µm, more preferably at least 50 µm, and preferably at most 1000 µm, more preferably at most 500 µm, very preferably at least 250 µm, more preferably at most 150 µm, especially preferably at most 130 µm, most preferably at most 100 µm. This is advantageous because in this way it is possible to suppress pressure peaks at the corners of the cross-sectional area of a glass element of this kind installed in a pressure sensor.

According to a further embodiment, the glass substrate comprises a glass with at least 50 wt % of $SiO_2$, preferably at least 55 wt % of $SiO_2$, more preferably at least 70 wt % of $SiO_2$, especially preferably at least 78 wt % of $SiO_2$, the $SiO_2$ content of the glass being limited preferably to at most 85 wt % of $SiO_2$, more preferably to at most 83 wt % of $SiO_2$. In other words, the glass takes the form preferably of highly $SiO_2$-rich glass. This is advantageous because in this way a glass is obtained which is amenable to an etching operation, with potassium hydroxide, for example, in a particularly efficient way. The advantageous surface structures of the side face of the opening can therefore be generated in a particularly simple way in a glass or glass element or glass wafer or glass substrate of this kind. The $SiO_2$ content of the glass, however, ought not to be too high, since otherwise the meltability of the glass is reduced. Preferably, therefore, the $SiO_2$ of the glass is limited, and according to one embodiment is at most 85 wt %, preferably indeed at most 83 wt %. By establishing the $SiO_2$ content within the aforesaid limits, the glass substrate is amenable to an efficient etching operation and at the same time can be produced in economic manufacturing operations.

According to a further embodiment, the glass substrate (or, correspondingly, the glass element or the glass wafer) comprises a glass with at least 1.5 wt % of $B_2O_3$, preferably at least 2.0 wt % of $B_2O_3$, more preferably at least 2.5 wt % of $B_2O_3$, very particularly at least 5 wt % of $B_2O_3$, with the $B_2O_3$ content of the glass being limited preferably to at most 15 wt %. $B_2O_3$ is a glass component which in general increases the chemical resistance of glasses. A certain $B_2O_3$ content also lowers the melting point of the glass and hence improves the meltability. This is advantageous particularly in the case of highly $SiO_2$-containing glasses. According to one embodiment, therefore, the glass, or the glass substrate comprising this vitreous material, comprises at least 1.5 wt %, preferably at least 2.0 wt %, of $B_2O_3$, more preferably at least 2.5 wt % of $B_2O_3$, very particularly at least 5 wt % of $B_2O_3$. This is favorable in particular if the glass element obtainable from the glass substrate, or glass element comprising the glass substrate, is to be used in pressure sensors where corrosive media are to come into contact with the glass or the glass element.

On the other hand, too high a $B_2O_3$ content in the glass is a disadvantage, since it would lead to the etchability of the glass being reduced and hence the fabrication of the glass element slowed down and consequently rendered uneconomic. The $B_2O_3$ content of the glass is therefore preferably limited and according to a further embodiment is not more than 15 wt %.

According to yet a further embodiment, the glass substrate comprises a glass with at least 2 wt % of $Al_2O_3$, where the $Al_2O_3$ content of the glass is limited preferably to at most 25 wt %.

$Al_2O_3$ is a preferred component, since $Al_2O_3$ is a component which particularly in borosilicate glasses prevents separation and therefore advantageously supports the producibility of the glass. The glass or the glass element comprising this glass, according to one embodiment, therefore comprises at least 2 wt % of $Al_2O_3$. However, too high an $Al_2O_3$ content in the glass or glass element may be a disadvantage, since $Al_2O_3$ is a component which may lower the chemical resistance, particularly the acid resistance, of a glass. This is a disadvantage in particular when the glass or the glass element comprising this glass comes into contact with corrosive media in use, as may be the case with pressure sensors in the offgas sector, for example. The $Al_2O_3$ content of the glass ought therefore not to be more than 25 wt %.

According to a further embodiment, the cross-sectional area has a mean superficial extent of between at least 0.04 $mm^2$ and at most 2.7 $mm^2$. This enables a compact design— that is, a small and space-saving design—of a pressure sensor. Equivalent diameters of such cross-sectional areas may therefore be, for example, between 0.3 mm and 0.9 mm.

According to yet a further embodiment, the glass wafer comprises multiple openings, where the land width between the openings is at least 0.3 mm, preferably at least 0.5 mm, and preferably at most 7 mm, more preferably at most 5 mm. This is advantageous since it enables efficient production of multiple openings simultaneously. Glass wafers in a customary format are also readily saleable and dispatchable in established operations.

The space utilization of a structured glass wafer or sheet, referring to the enablement of a maximum number of individual elements, is critical in numerous applications, as it is relevant to costs. Hence it emerges that the utilization of approximately square or rectangular holes, such as square or rectangular holes with rounded edges, for example, in comparison to round holes with the same superficial extent, is able to lead to a number of individual elements that is greater by several percentage points.

According to a further embodiment, in the case of the glass wafer comprising multiple openings, the ratio between the openings and the total area of the glass element is between 0.1% and 12%, preferably between 0.2% and 10%. This ensures sufficient stability of the glass wafer for customary handling operations.

According to yet a further embodiment, the thickness of the glass element or glass wafer is between at least 200 µm, preferably at least 300 µm, and at most 3500 µm, preferably at most 3000 µm, more preferably at most 2000 µm, very preferably at most 1800 µm, in the best case at most 1000 µm, so as to form a ratio between the thickness of the glass element/glass wafer and the mean lateral dimension—for example, the equivalent diameter—of the cross-sectional area of between at least 0.33 and at most 3. The thickness of the glass element or glass wafer here is on the one hand a determining factor of the mechanical stability of glass element or glass wafer and ought therefore not to be too low, in order to avoid increased glass breakage. On the other hand, for reasons of cost and weight and also for the realization of components in small-part form, such as pressure sensors, for example, the thickness ought not to be too great. It has emerged, furthermore, that the mechanical stability of a pressure sensor and also the quality of the data measured by such a pressure sensor may be further improved if a defined ratio is formed between the thickness of the glass element and the mean lateral dimension of the cross-sectional area. For the case of a cross-sectional area with a size which varies over the height of the opening, for example, the mean lateral dimension of the cross-sectional area may be the mean equivalent diameter. The statement of the equivalent diameter for the purpose of characterizing the size of the cross-sectional area is advantageous particularly in the case of polygonal cross-sectional areas, of the kind preferred according to the present disclosure. The equivalent diameter of the opening in this case is the diameter of a circle having the same superficial extent as the noncircle cross-sectional area under consideration. Thicknesses of pressure sensor glasses may be, for example, between at least 0.4 mm and at most 0.9 mm, although thicknesses of 1.6 mm and 2.7 mm are also possible, with preference being given to preferably low thicknesses of 200 μm for example.

According to one embodiment, the glass wafer has a thickness variation of less than 10 μm, preferably less than 5 μm, more preferably less than 2 μm, very preferably less than 1 μm.

According to one embodiment, the side face of the opening has an angle of inclination which is preferably at most 2°, the angle of inclination here being the deviation from an ideally straight-line side face (or sidewall) which would form an angle of 90° for surfaces of the glass wafer.

According to a further embodiment, at least one surface of the glass wafer and/or glass element is polished, thus having preferably a roughness $R_a$ of <2 nm, more preferably <1 nm. The surface in question is preferably the surface of the glass element or glass wafer that is intended to be joined with a silicon membrane.

This is advantageous because in this way the surface has only a little roughness, and can be joined to particularly good effect. It has emerged here that such polishing of the surface of a glass wafer, however, particularly in the region of openings, is regarded critically, since here, owing to mechanical damage to the glass, particularly in the edge region of the opening, it is possible for chipping to occur. Surprisingly it has emerged that particularly through the combination of an etched opening in accordance with this disclosure, as will also be elucidated more precisely in the process described hereinafter, where an advantageous configuration of the surface is achieved through establishment of a skewness within the limits specified in the present disclosure, with mechanical surface polishing, there are advantages here, since this combination of the etching and the mechanical polishing makes it possible to reduce, or even, advantageously, to entirely eliminate, instances of chipping in the marginal region.

A further aspect relates to a preferred process for producing a glass wafer or glass element comprising at least one opening, more particularly a glass element or glass wafer according to an embodiment, comprising the steps of: providing a sheetlike glass substrate, directing a laser beam of an ultrashort pulse laser onto one of the surfaces of the sheetlike glass substrate, where the laser beam is shaped by means of focusing optics into an elongated focus in the sheetlike glass substrate, so that the irradiated energy of the laser beam generates filamentary damage in the volume of the sheetlike glass substrate with a longitudinal direction perpendicular to the surface of the sheetlike glass substrate, and where, to generate filamentary damage, the ultrashort pulse laser emits a pulse or a pulse package with at least two successive laser pulses, guiding the impingement point of the laser beam on the sheetlike glass substrate along a predefined continuous line, to give a multiplicity of filamentary damages lying one beside another on the predetermined line in the sheetlike glass substrate, where preferably the filaments reach from one side of the sheetlike glass substrate to the other, etching the sheetlike glass substrate at least in the region in which filamentary damages are formed in the sheetlike glass substrate, in a liquid etching medium, where the filamentary damages are widened to give channels, so that the etching enlarges the diameter of the channels to such an extent that vitreous material between the channels in the sheetlike glass substrate is ablated, and so the channels combine and frame an opening which has a cross section with a cross-sectional area, where the cross-sectional area is delimited by a straight portion, preferably having a minimum length of at least 10 μm, more preferably at least 20 μm or even and very preferably at least 100 μm, where the opening has a side face which has a surface, which is preferably characterized in that it has a skewness Ssk, determined according to the following formula:

$$Ssk = \frac{1}{S_q^3}\left[\frac{1}{A}\int\int_A (Z(x, y)^3)dxdy\right]$$

of other than 0, the amount of the skewness Ssk being preferably at least 0.001 and more preferably at most 5, where preferably the amount of the skewness is at least 0.002, more preferably at least 0.003, very preferably at least 0.004 and especially preferably at least 0.01, and/or the amount of the skewness is at most 2.0, more preferably at most 1.5, optionally singulating the glass substrate (1) to give a glass element, where $S_q$ denotes the mean square roughness of the surface, or the RMS value, A is the area of the integration zone for which the Ssk value (or the skewness) is determined, Z(x,y) is the respective height value of the surface profile at the coordinates x, y, this height value being expressed relative to the arithmetic mean of the height values of the surface profile, and where the associated value Z(x,y) is positive if a point on the surface profile is higher than the mean, and negative if the point is below the mean; with particular preference, the skewness is determined in a planar region of the side face, preferably in the region which corresponds to the straight portion.

A filamentary damage here refers to a long, thin damage. Generally speaking, the filament is understood to be an elongated thin body or an elongated structure, with elongated meaning that the length of the structure or of the body is at least one, preferably at least two, order(s) of magnitude greater than the spatial extent in the two other dimensions, perpendicular to the length, of the body or of the structure—in particular, therefore, for example, to the equivalent diameter of the cross-sectional area that extends perpendicularly to the length of the body or the structure. A filamentary damage therefore has only a low cross-sectional area in comparison to the length of the damage.

The process above has proven particularly advantageous. However, it is not intended that the patent application should be limited to this process. Alternatively it is possible to utilize processes such as CNC drilling, ultrasonic vibratory lapping, sandblasting, and local etching.

Because the filamentary damages are generated along a predetermined line in or on the sheetlike glass substrate, it is very easily possible to determine the contour of the opening generated in the sheetlike glass substrate by means of the process. In particular it is especially easy in this way to generate an opening which is delimited by a straight portion, preferably having a minimum length of at least 10 μm, more preferably at least 20 μm, or even and particularly preferably at least 100 μm. Other geometries for the opening, however, are also possible, and in this way it is also conceivable in principle to generate complex geometries for the openings. Preferably, however, the process can be used to generate linear polygonal cross-sectional forms, including, for example, rectangular and/or square two-dimensional forms, which may also be present with rounded corners. This may be achieved in particular through the suitable choice of the linear shape in combination with the etching of the glass material between the damages.

The etching medium preferred is, advantageously, an alkaline etching medium.

It has emerged in this context that an advantageous configuration of the surface of the side face of the opening can be obtained in particular, for example, through a skillful choice of the ablation rate. According to one preferred embodiment, therefore, the vitreous material of the glass element is ablated with an ablation rate of less than 5 μm per hour.

Alternatively or additionally, the shape of the cross-sectional area and/or the configuration of the surface of the side face of the opening may be influenced advantageously if the etching time is at least 12 hours.

A process of this kind can be carried out, for example, in a basic etching bath having a pH of more than 12. Preference is given to a KOH solution, more particularly having a KOH concentration of more than 4 mol/l, more preferably of more than 5 mol/l, especially preferably of more than 6 mol/l, although the concentration ought to be less than 30 mol/l. The etching according to one embodiment may be carried out independently of the etching medium used, at an etching bath temperature of more than 70° C., preferably more than 80° C., more preferably more than 90° C., but below 100° C.

The deliberate progress of material ablation and/or the introduction of the filamentary damage, specifically, can also be influenced in particular by a suitable selection of material. It has emerged in this context that glasses with high silicate content, these being glasses having an $SiO_2$ of at least 50 wt %, preferably at least 55 wt % of $SiO_2$, more preferably at least 70 wt % of $SiO_2$, are especially suitable for producing a glass element according to the present embodiments, more particularly according to the process described above.

According to one embodiment, the etching may be followed by mechanical polishing of at least one surface, more particularly the surface which in a pressure sensor is facing a silicon membrane.

One particularly advantageous glass composition in this context may be if the glass is configured as borosilicate glass. The reason is that the combination of $SiO_2$ content and $B_2O_3$ content can achieve an effective compromise between sufficient meltability of the glass with sufficient chemical resistance for subsequent application of the glass element, in contact, for example, with corrosive media, such as a pressure sensor for the automotive sector, for example, and etchability in a wet-chemical etching operation that is still sufficient. Having therefore emerged as being advantageous is a glass element comprising a glass, the glass comprising between 50 wt % and 85 wt % of $SiO_2$, preferably between 78 wt % and 83 wt % of $SiO_2$, and also between at least 1.5 wt % of $B_2O_3$, preferably at least 2.0 wt % of $B_2O_3$, more preferably at least 2.5 wt % of $B_2O_3$, very particularly at least 5 wt % of $B_2O_3$, and 15 wt % of $B_2O_3$.

In view of the known inclination of borosilicate glasses, it may further be advantageous if the glass alternatively comprises a component which counteracts separation. Advantageously, therefore, according to one embodiment, the glass or the glass element comprises not only $SiO_2$ and $B_2O_3$ at the stated levels but additionally $Al_2O_3$ as a component, preferably at not less than 2 wt %. On the other hand, however, $Al_2O_3$ is also a component which can have a great influence on the chemical resistance of a glass. It is known, accordingly, that in certain glasses $Al_2O_3$ may also lead to an improvement in the chemical resistance specifically in the alkaline range. In order to ensure sufficient etchability of the glass by an alkaline etching medium, therefore, the $Al_2O_3$ content of the glass ought not to be too high, and is therefore preferably limited to at most 25 wt %. It has emerged that a glass of this kind, comprising $SiO_2$, $B_2O_3$ and $Al_2O_3$ within the limits stated above, is surprisingly amenable to a relatively slow etching process, i.e., a process with a fairly low etching rate and/or a long etching time, this being advantageous for the development of a defined surface configuration.

Glass elements comprising, or produced from a glass comprising the following components in wt % have emerged as being particularly preferable for providing a glass element according to embodiments and/or producible in a process according to embodiments:

| COMPOSITION RANGE 1: | |
| --- | --- |
| $SiO_2$ | 60 to 65 |
| $B_2O_3$ | 6 to 10.5 |
| $Al_2O_3$ | 14 to 25 |
| MgO | 0 to 3 |
| CaO | 0 to 9 |
| BaO | 3 to 8 |
| ZnO | 0 to 2, | where the sum of the amounts of MgO, CaO and BaO is characterized in that it is in the range from 8 to 18 wt %.

| COMPOSITION RANGE 2: | |
| --- | --- |
| $SiO_2$ | 60 to 85 |
| $B_2O_3$ | 5 to 20 |
| $Al_2O_3$ | 2 to 15 |
| $Na_2O$ | 3 to 15 |
| $K_2O$ | 3 to 15 |
| ZnO | 0 to 12 |
| $TiO_2$ | 0.5 to 10 |
| CaO | 0 to 0.1 |

| COMPOSITION RANGE 3: | |
| --- | --- |
| $SiO_2$ | 75 to 85 |
| $B_2O_3$ | 8 to 15 |
| $Al_2O_3$ | 2 to 4.5 |
| $Na_2O$ | 1.5 to 5.5 |
| $K_2O$ | 0 to 2 |

COMPOSITION RANGE 4:

| | |
|---|---|
| $SiO_2$ | 20 to 70, preferably 50 to 60, more preferably 52 to 58 |
| $B_2O_3$ | 0.5 to 14, preferably 2 to 12, more preferably 2 to 4 |
| $Al_2O_3$ | 15 to 41, preferably 16 to 24, more preferably 18 to 23 |
| MgO | 0.5 to 15, preferably 2 to 12, more preferably 3 to 5 |
| CaO | 0 to 5, preferably 0 to 3 |
| BaO | 0 to 7, preferably 0 to 6 |
| ZnO | 0 to 20, preferably 2 to 12, more preferably 8 to 10 |
| NaO | 0 to 7, preferably 1 to 6, more preferably 3 to 5 |

In all of the above-stated composition ranges there may additionally be secondary constituents and/or traces included, in the form, for example, of coloring substances and/or refining agents, as for example $SnO_2$, $CeO_2$, $As_2O_3$, $Cl^-$, $F^-$, sulfates.

In general, without restriction to the composition ranges described here, it may be advantageous for the vitreous material to be in a form which is anodically connectable (or bondable). For that purpose it may be advantageous for the vitreous material to have a certain fraction of alkali metals and/or alkali metal oxides, more particularly sodium and/or sodium oxide. The $Na_2O$ content ought to be at least 0.5 wt % but ought preferably not to exceed 6 wt %.

Another advantageous configuration of the process, alternatively or additionally, is when the spatial distance of two points of impingement of the laser beam on the at least one surface of the sheetlike glass substrate is at most 6 μm, preferably at most 4.5 μm, and/or if the number of pulses in a burst for introducing filamentary damage is at most 2 or at least 7 and/or if the pulse duration of the laser is in the range from 0.5 ps to 2 ps for a spatial distance between two impingement points of the laser beam on the at least one surface of the sheetlike glass substrate of 1 μm to 15 μm, preferably up to at most 6 μm, as for example up to at most 4.5 μm.

Yet a further aspect relates to a pressure sensor, as for example a piezoresistive or capacitive pressure sensor, preferably a piezoresistive pressure sensor, comprising at least one glass element according to one embodiment.

A pressure sensor of this kind may generally comprise at least one silicon membrane.

The glass element here is preferably designed in such a way that the side face of the opening has an angle of inclination which is preferably at most 2°. The angle of inclination here is the deviation from an ideally straight-line sidewall which would form an angle of 90° with the surfaces of the glass element.

In this way, the design of the glass element is such that the superficial extent of the opening on one surface of the glass element is greater than on the other glass element surface, opposite to the first surface. The pressure sensor here, according to one embodiment, may be designed such that the surface of the glass element on which the superficial extent of the cross-sectional area is greater is facing the silicon membrane. This is also referred to as "inverted conical". It has emerged, surprisingly, that a configuration of this kind is more advantageous, for the mechanical stability and also for the stability of the measurement results for a pressure sensor, than the converse configuration with an opening cross-sectional area decreasing toward the silicon membrane.

The reason is that, in the case of the opening of the glass element on the side facing away from the silicon membrane being greater than on the side facing the silicon membrane, the opening acts like a nozzle and there are significant temporal pressure fluctuations in the measuring cavity, which may result not only in imprecise pressure measurement results but also in increased mechanical loading of the silicon membrane.

It has therefore emerged, furthermore, that it may be advantageous if the opening on the side facing away from the silicon membrane or silicon membranes is smaller than on the side facing the silicon membranes or silicon membrane. In this way, for example, there is a greater area available for attachment to a further component on the side of the glass element that faces away from the silicon membrane or silicon membranes. This is advantageous since it is able to improve the mechanical stability of a bond between the pressure sensor and a further component.

According to a further embodiment, however, provision may also be made for the pressure sensor to be configured such that the side face of the opening of the glass element has an angle of inclination which is preferably at most 2°, the angle of inclination here being the deviation from an ideally straight-line side face which would form an angle of 90° with the surfaces of the glass wafer, where the opening has a cross section with a cross-sectional area which tapers in the direction of the silicon membrane. According to this embodiment, in other words, the cross-sectional area of the opening on the side facing the silicon membranes or silicon membrane is smaller than on the side of the glass element which faces away from the silicon membrane or silicone membranes. This may be advantageous because in this way it is possible to attain the maximum pressure in the pressure sensor within a relatively short time. This may be shown, illustratively, on the basis of FIG. 12, which is elucidated below in the description of the figures. With a so-called "conical" embodiment of the opening of this kind, indeed, it is possible, for example, that preferably a time which is at least 30%, more preferably indeed at least 40%, shorter can be achieved for attaining the maximum pressure at not less than point one A, B on a silicon membrane comprised by the pressure sensor, than in the case of a constant or expanding cross-sectional area of the opening.

According to one embodiment, the configuration of the pressure sensor is such that it comprises a glass element and also a silicon membrane, with the shape of the silicon membrane being formed according to the opening of the glass element, so that the shape of the silicon membrane corresponds to the shape of the opening insofar as the side ratios of silicon membrane and opening are the same.

It is particularly advantageous—as also discussed earlier on above in relation to the technical advantages and effects of a geometry of the cross-sectional area—if the ratio of the cross-sectional area of the cavity to the cross-sectional area of the opening in the glass element is small. Preferably, according to one embodiment, the ratio of the cross-sectional area of the cavity to the cross-sectional area of the opening is less than 10, preferably less than 5. According to one embodiment, therefore, the configuration of the pressure sensor is such that a cavity of the silicon membrane has a cross-sectional area, and the ratio of the cross-sectional area of the cavity to the cross-sectional area of the glass element is less than 10, preferably less than 5.

With glass compositions in accordance with the above-stated composition ranges, it is possible, for example, to achieve the skewness values Ssk set out in the table below. The topmost line in these tables lists in each case the composition range of the glass of the glass element or glass wafer. For the measurement, glass elements according to embodiments of the present disclosure were used. The surface of the sidewall of the opening was measured, preferably in at least one region which can be assigned to the straight portion of the opening. These glass elements were presently obtained in a process according to the present disclosure, in other words by laser machining to generate a filament or multiple filaments and then implementation of an etching process. Different parameters were used for the etching, this being indicated in the second row with "etching parameters".

Lastly, the parameters of the laser machining to generate the filaments may also differ between measuring points A to J. It is therefore evident from the samples listed in the two tables below that the roughness of the surface of the sidewall of the opening can be made different.

| | Composition range | | | |
|---|---|---|---|---|
| | 4 | 4 | 2 | 2 |
| | | Etching parameters | | |
| | 1 | 2 | 1 | 2 |
| A | −0.0042 | −0.0164 | −0.2136 | −0.4591 |
| B | −0.0071 | −0.1241 | −0.5829 | −0.5780 |
| C | −0.1619 | −0.1620 | −0.6534 | −0.6812 |
| D | −0.2337 | −0.1816 | −0.7696 | −0.8759 |
| E | −0.3601 | −0.2167 | −0.8000 | −1.0196 |
| F | −0.3844 | −0.2593 | −0.8510 | −1.0902 |
| G | −0.4503 | −0.3165 | −0.9791 | −1.2563 |
| H | −0.5217 | −0.4029 | −1.0476 | −1.3223 |
| I | −0.5780 | −0.5903 | −1.1321 | −1.4034 |
| J | −0.8341 | −1.1901 | −1.4505 | −1.4850 |

| | Composition range | | | |
|---|---|---|---|---|
| | 4 | 4 | 2 | 2 |
| | | Etching parameters | | |
| | 4 | 5 | 1 | 2 |
| A | 5.1262 | 1.5912 | −0.2136 | 0.1649 |
| B | 1.3716 | 1.0797 | −0.5669 | −0.5217 |
| C | 0.8894 | 0.6995 | −0.6599 | −0.6812 |
| D | 0.1786 | 0.6006 | −0.7732 | −0.8307 |
| E | 0.0030 | 0.4045 | −0.8245 | −1.0037 |
| F | −0.1298 | 0.3053 | −0.9881 | −1.0196 |
| G | −0.2268 | 0.2423 | −0.9985 | −1.0447 |
| H | −0.3165 | 0.0521 | −1.1263 | −1.1642 |
| I | −0.4591 | 0.0011 | −1.2182 | −1.2624 |
| J | −1.1901 | −0.4414 | −1.4505 | −1.4850 |

BRIEF DESCRIPTION OF THE DRAWINGS

In the text below, the invention is elucidated in more detail using figures. In these figures, identical reference symbols relate to elements that are the same or correspond to one another.

DETAILED DESCRIPTION

Figure 1:
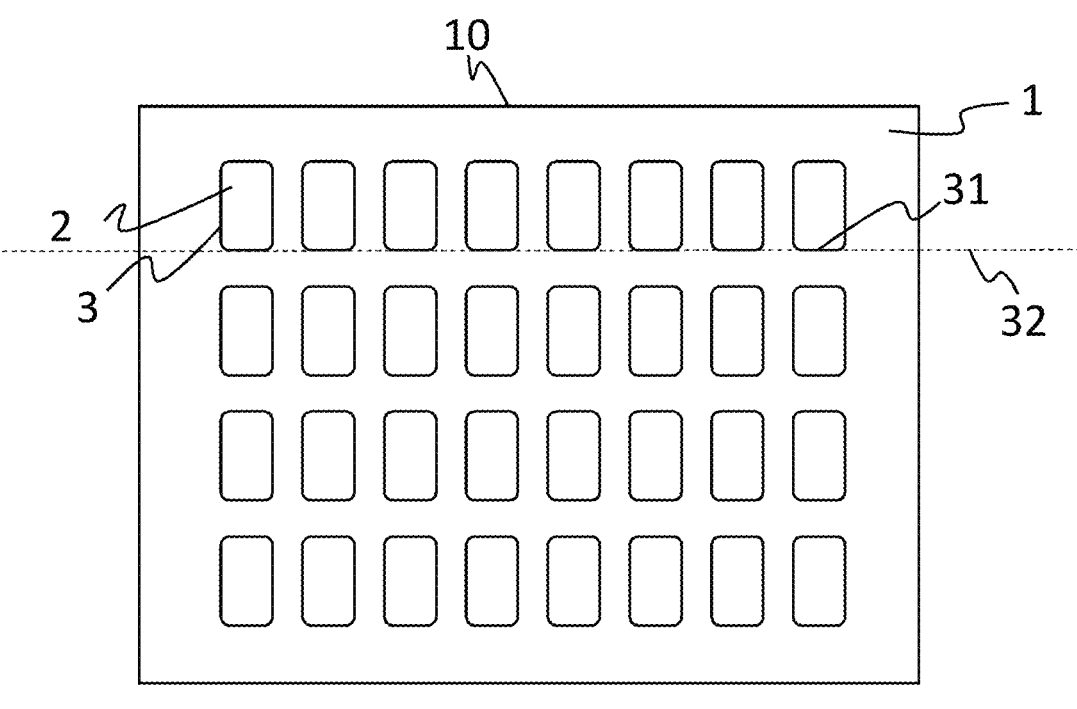
FIGS. 1 to 3 show schematic representations, not true to scale, of embodiments of glass wafers.
Figure 2:
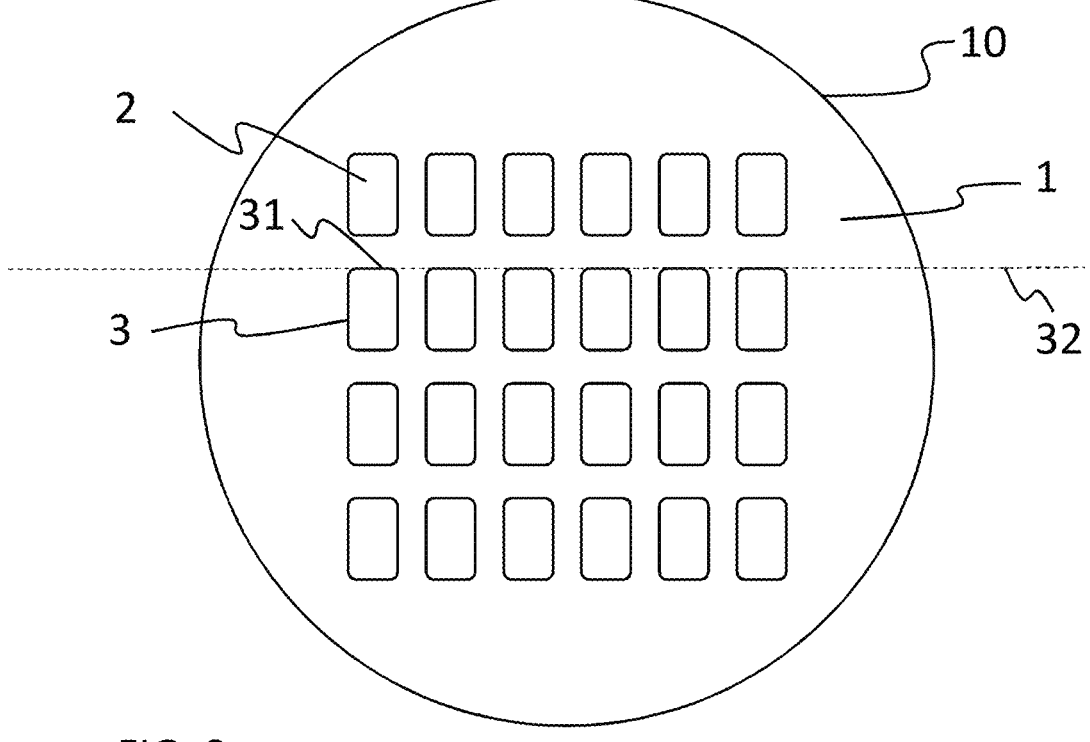
Figure 3:
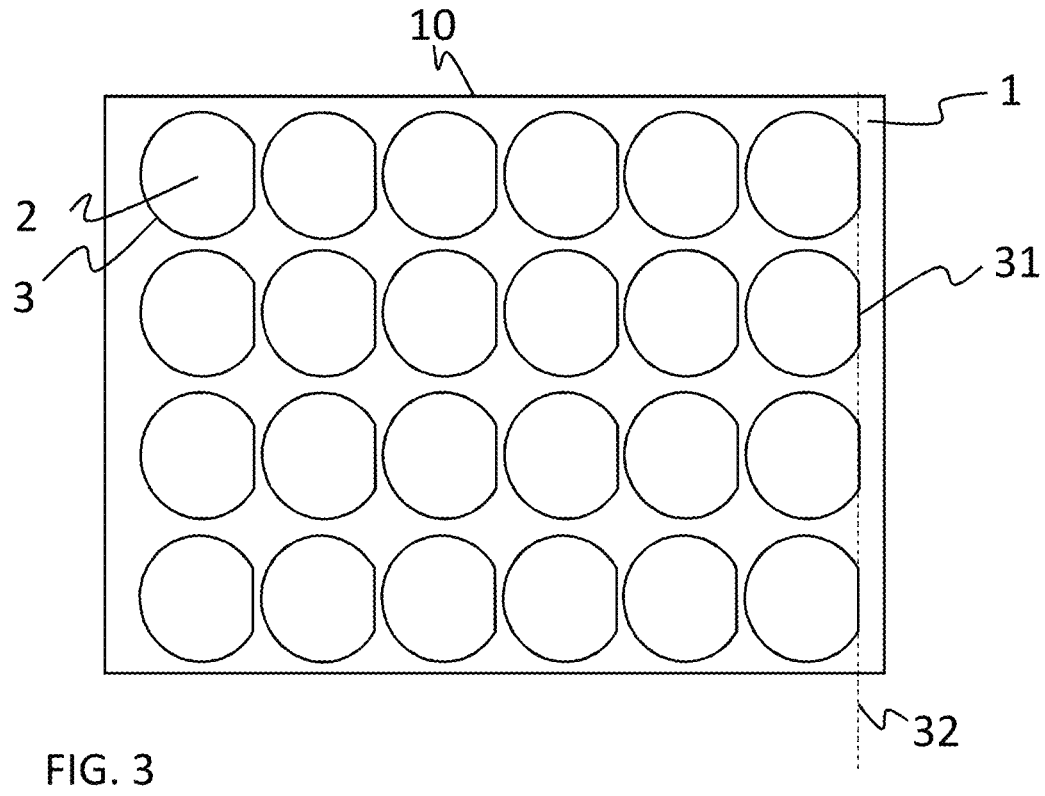

FIGS. 1 to 3 each show schematic representations, not true to scale, of glass wafers 10 which comprise multiple openings 2. The openings 2, which for the sake of comprehension are not all labeled, here, illustratively, have a cross-sectional area 3 which is delimited by a straight portion 31, preferably having a minimum length of at least 10 μm, more preferably at least 20 μm or even and particularly preferably of at least 100 μm. In the glass wafers 10 represented in each of FIGS. 1 and 2, the cross-sectional areas 3 of the openings 2 are each delimited by four straight portions 31, which, however, for the sake of clarity, have not all been drawn in, and so the cross-sectional areas 3 here each have the shape of a rectangle, and here illustratively a rectangle with rounded corners. In general, however, other cross-sectional areas are conceivable, in the form of a circular segment, or, generally, polygonal cross-sectional areas 3, as represented illustratively in FIG. 3 for openings 2. For better clarity, the openings 2 here are represented as being large in case in comparison to the glass wafer 10; for the production of miniaturized components, such as a pressure sensor with a compact design, for example, the openings 2 will generally be smaller by comparison with the dimensions of the glass wafer 10. Typical equivalent diameters of openings 2 may be, for example, less than 1 mm. Also represented is the straight line 32. The straight portion 31 may therefore also be understood as being part of a straight line 32.

FIGS. 1 to 3 show in each case a configuration of a glass wafer 10 comprising multiple openings 2. These glass wafers 10 are therefore intermediates in the production of framelike glass elements 100 which each comprise only one opening 2. The glass wafers 10 represented in FIGS. 1 to 3 enable rapid and cost-effective production. This is advantageous because in this way not only is it possible to produce multiple openings efficiently at the same time, but a glass wafer is also, for example, more easily saleable and dispatchable. Singulation and installation into a miniaturized component such as a pressure sensor may in that case optionally take place at the premises of the customer itself, indeed.

Figure 4:
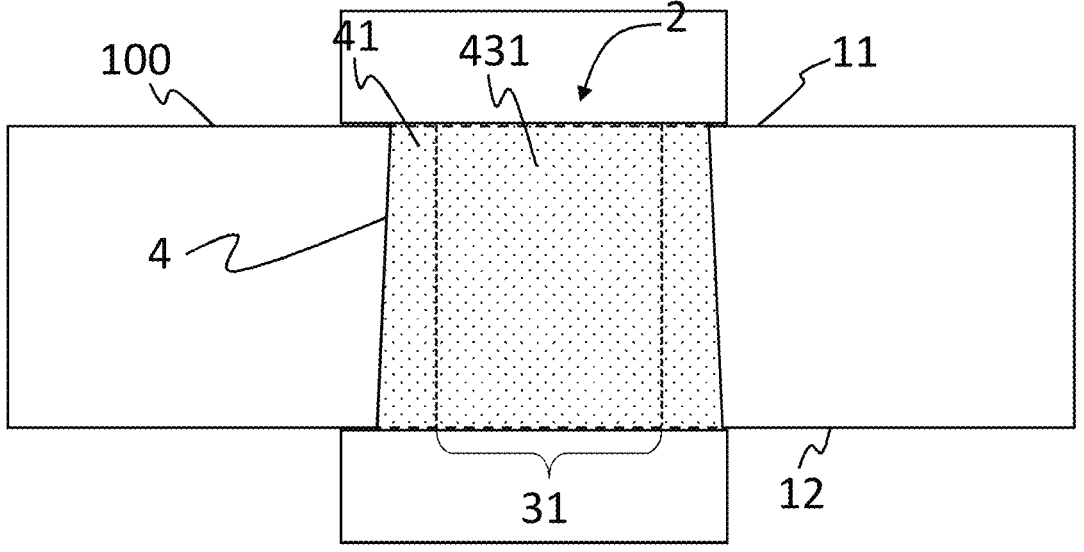
FIG. 4 shows a schematic figure, not true to scale, of an embodiment of a glass element.

FIG. 4 shows a schematic representation, not true to scale, of an embodiment of a framelike glass element 100 which comprises only one opening 2. The glass element 100 comprises a sheetlike glass substrate 1 comprising a surface (or main face or side) 11 and also a further surface 12 opposite the first surface 11. The glass element 100 or the glass substrate 1 may advantageously be designed such that the surfaces 11 and 12 are parallel to one another within the bounds of customary manufacturing tolerances. In this case the glass element 100 (or the glass substrate 1) is arranged recumbently or horizontally, and so the surface 11 may also be referred to here as the top side, and the surface 12 also as the bottom side.

FIG. 4 represents the glass element 100 in a sectional representation, with the section passing through the opening 2. The opening 2 has a side face 4 which has a surface 41 which is preferably characterized by a skewness Ssk, determined according to the following formula $$Ssk = \frac{1}{S_q^3}\left[\frac{1}{A}\int\int_A (Z(x,\ y)^3)dxdy\right]$$

of other than 0, where the amount of the skewness Ssk is preferably at least 0.001 and more preferably at most 5, where preferably the amount of the skewness is at least 0.002, more preferably at least 0.003, very preferably at least 0.004, and especially preferably at least 0.01, and/or the amount of the skewness is at most 2.0, more preferably at most 1.5, where $S_q$ denotes the mean square roughness of the surface, or the RMS value, A is the area of the integration zone for which the skewness is determined, Z(x,y) is the respective height value of the surface profile at the coordinates x, y, this height value being expressed relative to the arithmetic mean of the height values of the surface profile, and where the associated value Z(x,y) is positive if a point on the surface profile is higher than the mean, and negative if the point is below the mean, the skewness being determined with particular preference in a planar region of the side face 4, preferably in a region 431 which corresponds to the straight portion 31. In the representation of FIG. 4, the region 431 is represented in plan view. It is part of the side face 4 and corresponds here to the part of the side face 4 in which the cross-sectional area of the opening is delimited by the straight portion 31.

Figure 5:
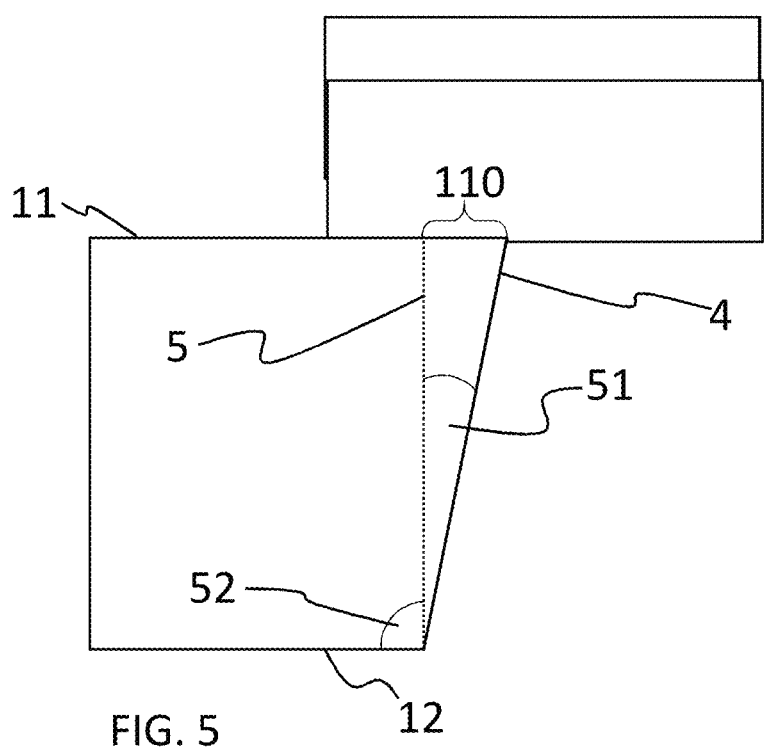
FIG. 5 shows a schematic representation of part of a glass element to illustrate the angle of inclination.

FIG. 5 represents the surface 41 of the side face 4 in plan view, schematically in the form of a dotted surface.

The side face 4 of the glass element 100 represented in FIG. 4 is inclined. In other words, the side face 4 has an angle of inclination which, however, for the sake of clarity is not represented in FIG. 4. The reason is that the angle of inclination of the side face (or sidewall) 4 of the opening 2 is preferably only very small.

Represented schematically in FIG. 5, not true to scale, is a detail of part of a glass element 100 (or of a glass wafer 10) in order to further elucidate the angle of inclination 51 of the side face 4. The dashed line 5 here shows the profile of a hypothetical sidewall (not designated) which would run ideally straight, in other words at right angles (angle 52) to the surfaces 11, 12 of the glass element 100 (or the glass substrate 1). With this line 5 (which in geometrical terms may also be understood as the "height" of a triangle with the sides 4, 5 and 110 or, based on the glass element 1, as the thickness of the glass element 1). The sidewall 4 of the glass element 100 (or glass substrate 1) encloses the angle 51. This angle 51 is also referred to here as the angle of inclination. It therefore indicates the size of the deviation from an ideally straight-line sidewall which would form an angle of 90° with the surfaces 11, 12 of the glass element 100. The angle of inclination is preferably at most 2°—in other words, the inclination of the side face 4 is only very slight. As a result of this, the size of the cross-sectional area 3 of the opening 2 is varied only to a very small degree over the height of the opening 2. Embodiments in which the cross-sectional area is the same on both sides 11, 12 of the glass element 100, within the bounds of customary manufacturing tolerances, may be preferable. Specifically for the use of the glass element 100 in a piezoresistive pressure sensor, however, It may be advantageous if the size of the cross-sectional area 3 on one surface of the glass element 100 is greater.

Figure 6:
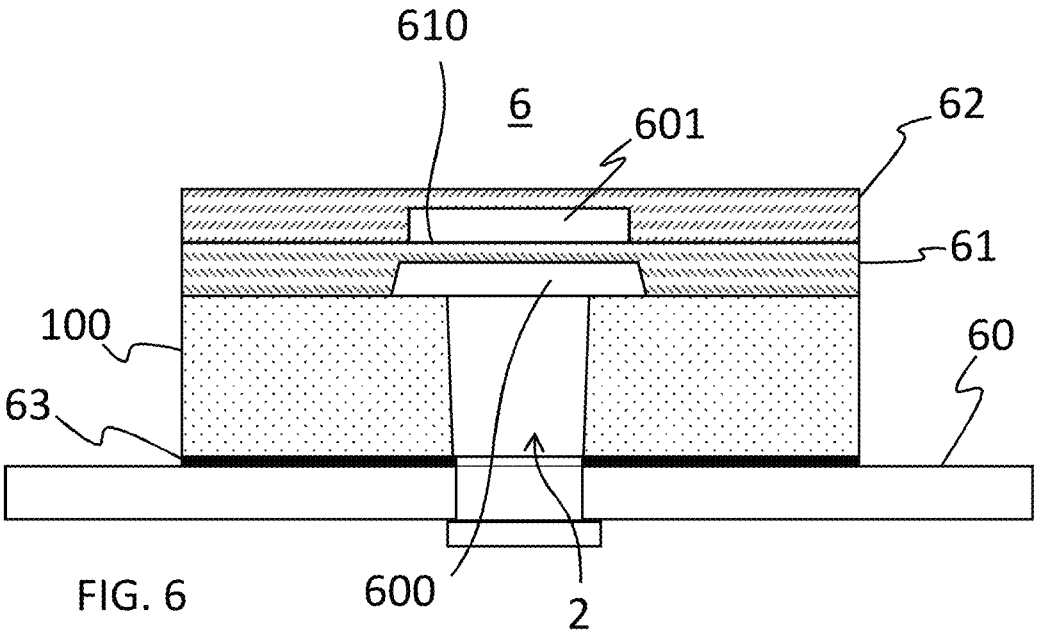
FIG. 6 shows a schematic representation, not true to scale, of an embodiment of a piezoresistive pressure sensor.

An illustrative pressure sensor 6 is shown by FIG. 6, in a schematic representation which is not true to scale. The pressure sensor 6 is represented in a sectional representation and comprises a pedestal 60, which may be formed, for example, of a ceramic material. On the pedestal 60 the glass element 100 is mounted by means of an adhesive layer 63, formed for example of an epoxy resin. The glass element 100 has an opening 2, with the sidewall 4 being formed here with an inclination, so that the cross-sectional area 3 (not shown) of the opening 2 on the surface 11 is greater than on the surface 12 of the glass element 1. Toward the measuring cavity 600 of the pressure sensor 6 or toward the silicon membrane 62, therefore, the size of the opening 2 increases. The pressure sensor 6 optionally further comprises another silicon membrane 61, which forms the reference pressure cavity 601.

Without restriction to the example represented, a pressure sensor 6 in accordance with this disclosure may take the form in particular of a piezoresistive or capacitive pressure sensor and may comprise at least one glass element 100 according to this disclosure that has an opening 2 whose surface has the structure described here with a nonzero skewness. Joined to the glass element 100 in this case is an element which for pressure measurement has a deformable membrane. According to one preferred embodiment, a silicon element is provided here, or a silicon membrane 61 with a deformable membrane portion 610. The element, such as more particularly the silicon membrane 61, is bonded anodically on the glass element 100. Independently of the nature of the connection, the surface of the glass element 100 that is joined to the membrane is mechanically polished according to one preferred embodiment. One of the possibilities this provides is that of a particularly stable connection by means of anodic bonding. The connection produced with anodic bonding is apparent from the fact that the surfaces of the two elements are joined directly to one another, or are in direct contact. Lastly, the element joined to the glass element 100, such as the silicon membrane 61 in particular, has a cavity 600 into which the opening 2 opens.

Figures 7, 8:
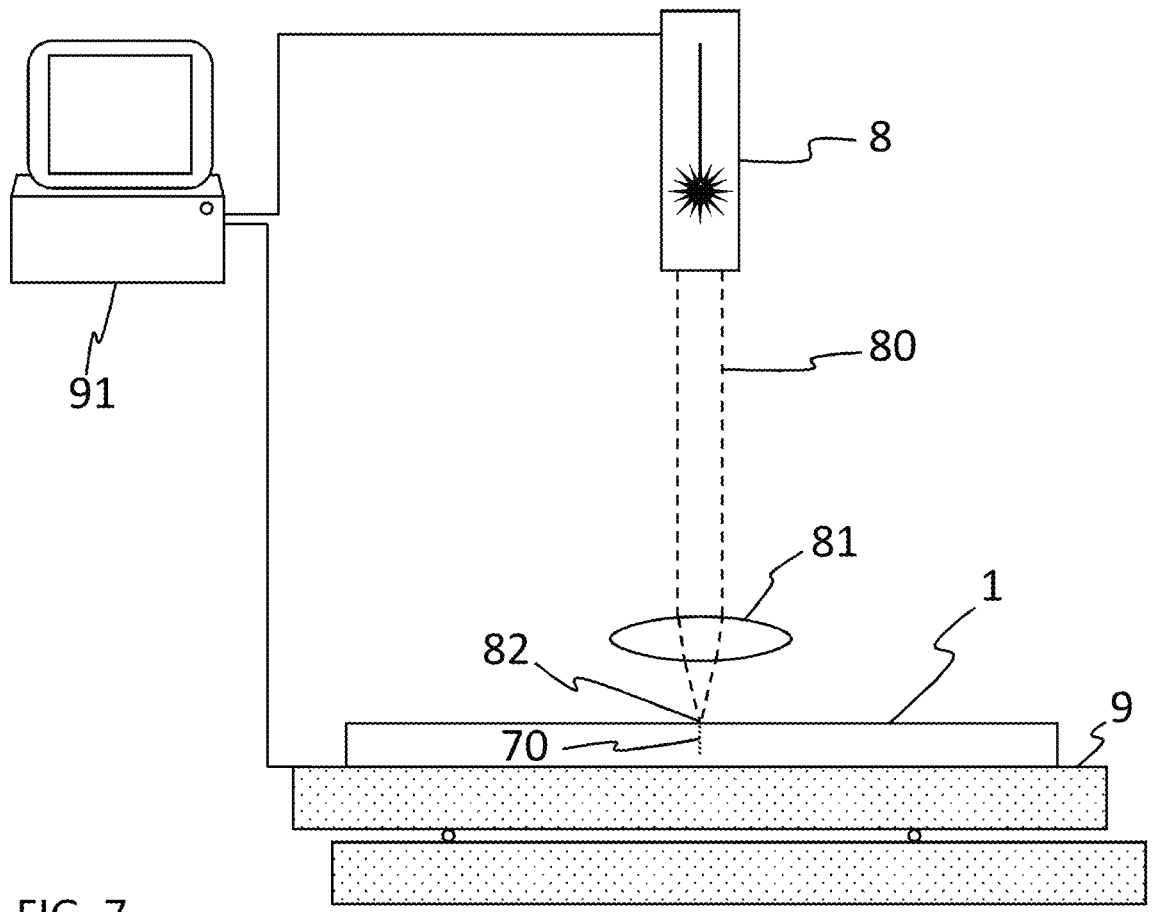
FIG. 7 shows a schematic representation, not true to scale, of the process for producing a glass wafer or a glass element.
FIG. 8 shows a schematic representation, not true to scale, of a glass substrate as an intermediate in the process for producing a glass wafer or glass element.

Described in FIG. 7 is the production of a glass element 100 or glass wafer 10 according to one embodiment of the process.

In the process for producing a glass element 100 or a glass wafer, the laser beam 80 from an ultrashort pulse laser 8 is directed onto one of the surfaces 11, 12 of a sheetlike glass substrate 1. The laser beam 800 here is shaped by means of focusing optics 81 to form an elongated focus in the sheetlike glass substrate 1. In this way the irradiated energy of the laser beam 80 generates filamentary damage 70 in the volume of the sheetlike glass substrate 1, the longitudinal direction of said damage being perpendicular to the surface 11, 12 of the sheetlike glass substrate 1. To generate filamentary damage 70, the ultrashort pulse laser 8 emits a pulse or a pulse packet with at least two successive laser pulses. The impingement point 82 of the laser beam 80 is guided on the sheetlike glass substrate along a predefined continuous line 71, and so a multiplicity of filamentary damages 70, lying one beside another on the predefined line 71, are obtained in the sheetlike glass substrate 1. These filaments 71 reach preferably from one surface 11, 12 of the sheetlike glass substrate 1 to the other surface 11, 12. This guiding of the impingement point 82 on a continuous line 71 may be accomplished by means of a positioning device 9, for example. This device may be driven by way of a computing device 91, for example. The computing device 91 may judicially also control the laser power. It is of course also possible to use a plurality of computing devices 91.

In the further course of the process, the sheetlike glass substrate 1 is etched, at least in the region in which filamentary damage 70 have been formed in the sheetlike glass substrate 1, in a liquid etching medium, and the filamentary damages 70 are expanded to form channels. As a result of the etching, the diameter of the channels is increased to an extent such that the vitreous material located between the channels in the sheetlike glass substrate 1 is ablated. The channels therefore combine and frame an opening 2 which has a cross section with a cross-sectional area 3, where the cross-sectional area 3 is delimited by a straight portion 31, preferably with a minimum length of at least 10 μm, more preferably at least 20 μm or even and particularly preferably at least 100 μm, where the opening 2 has a side face 4 which has a surface 41 which is preferably characterized by a skewness Ssk $$Ssk = \frac{1}{S_q^3}\left[\frac{1}{A}\int\int_A (Z(x,\ y)^3)dxdy\right]$$

of other than 0, where the amount of the skewness Ssk is preferably at least 0.001 and more preferably at most 5, where preferably the amount of the skewness is at least 0.002, more preferably at least 0.003, very preferably at least 0.004, and especially preferably at least 0.01, and/or the amount of the skewness is at most 2.0, more preferably at most 1.5, where $S_q$ denotes the mean square roughness of the surface, or the RMS value, A is the area of the integration zone for which the skewness is determined, Z(x,y) is the respective height value of the surface profile at the coordinates x, y, this height value being expressed relative to the arithmetic mean of the height values of the surface profile, and where the associated value Z(x,y) is positive if a point on the surface profile is higher than the mean, and negative if the point is below the mean, the skewness being determined with particular preference in a planar region of the side face 4, preferably in a region 431 which corresponds to the straight portion 31.

The predefined continuous line 71 forms the contour of the cross-sectional area 3.

The steps represented in and elucidated with reference to FIG. 7 may be followed by the polishing of at least one surface of the glass element or glass wafer. FIG. 8 is a plan view of a sheetlike glass substrate 1 into which a plurality of filamentary damages 70 have been made. For the sake of improved clarity, these have not all been labeled. The filamentary damages 70 here were made in the glass substrate 1 in a form such that they have been applied along a continuous line 71, which here, illustratively, forms the contour of a rectangle with rounded corners. For the glass substrate represented illustratively in FIG. 7, filamentary damages 70 have been introduced along four continuous lines 71, and so here, in a subsequent etching operation, the result would be a glass wafer having four openings; however, it is self-evident that the number of openings can be adapted in accordance with the size of the openings, the size and the shape of the sheetlike glass substrate, particularly in order to achieve a corresponding utilization of surface area.

Generally speaking, a process of this kind with filamentalization and with a subsequent etching operation is advantageous because, in this way, relatively small radii can be achieved in the corners of the opening, and this may be an advantage specifically when producing cross-sectional areas having at least one straight portion. With the conventional UVL process, a minimum radius of 150 μm is obtained. Conversely, with the process described, radii of smaller than 150 μm, preferably smaller than 100 μm, are possible. A lower limit to the corner radius may be, generally, 20 μm.

Figure 9:
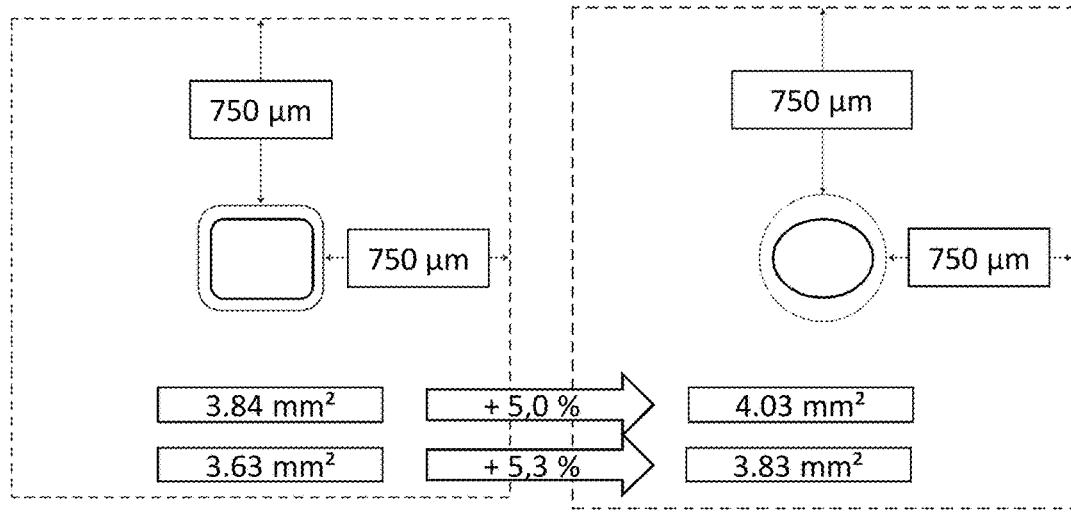
FIGS. 9 and 10 show representations for increasing the structural elements on a 6" wafer on transition from a round opening to an angular opening for the same opening volume.
Figure 10:
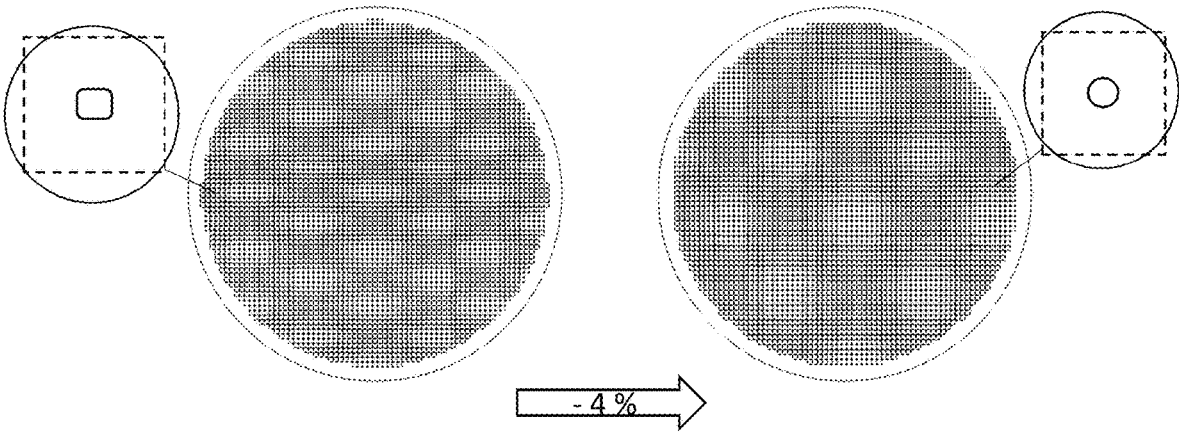

FIGS. 9 and 10 show the advantages of the transition from a round opening to an opening which has a cross section with a cross-sectional area which is delimited by at least one straight portion, preferably having a minimum length of the straight portion of at least 10 μm, more preferably at least 20 μm or even and particularly preferably at least 100 μm, in terms of the density of wafer occupation. The opening in the left-hand region of FIG. 9 has dimensions of 500 μm*420 μm with a radius of the corners of 90 μm. The opening in the right-hand region of FIG. 9 has a radius of 254.2 μm. Considering an identical flow transits area, in this case 203.000 μm², and also identical land widths of the wall of the opening at the margin of a pressure sensor pedestal (here 750 μm), the individual podiums in the case of the not entirely round opening, whose cross-sectional area is therefore delimited by at least one straight portion, are smaller laterally by several percentage points. Transposed to a 6" wafer, the utilization of area is better here, likewise in the region of several percentage points (FIG. 10), and therefore a cost saving. Also indicated in FIG. 9 are percentages. These relate to the total area of the glass element for the case of the glass element dimensions indicated in FIG. 9. This total area is 5% greater for the case of the round opening. For the case where only the bondable or connectable face of the glass element (i.e., minus the cross-sectional area of the opening) is considered, this area is 5.3% greater for the case of the round opening, for the opening dimension case represented in FIG. 9. In FIG. 10 it is apparent that the number of openings which can be realized on a wafer, for otherwise the same land width, decreases by 4% for the case of a round opening geometry, in comparison to the opening represented in the left-hand part of FIG. 10, with a cross-sectional area which is not completely round.

FIGS. 11*a*-11*d* and FIGS. 12*a*-12*c* show calculations and corresponding models of the fluid dynamics in an illustrative axially symmetrical pressure sensor cavity, utilizing a round pedestal opening with straight walls in comparison to a pedestal opening with inclined walls. The illustrative medium utilized here is substantially incompressible water, which flows laminarly. It enters the cavity at 30 bar, where it is distributed unevenly over time because of reflections from the walls. At two illustrative points A and B in the middle and the side of the cavity membrane, respectively, the pressures are temporally different. The complete pressure equalization here takes place within microseconds.

At a first approximation, the duration of the pressure equalization is situated in the same order of magnitude irrespective of the shaping of the opening (straight or upwardly or downwardly inclined walls). However, in the case of very sensitive pressure measurements, which require the upmost precision, even small shifts may be critical. Hence it emerges, surprisingly, that with slightly conical structures in particular, there is a shorter time to attain the maximum pressure. On the other hand, tapering structures produce higher pressure fluctuations before the complete pressure equalization is attained.

If the desire is to attain a more rapid pressure equalization, an alternative advantage, as well as a tapering cross section, is an opening with in principle a lower cross-sectional area, albeit it with straight walls.

It also emerges from the calculations, surprisingly, that in the case of very high-frequency applications, in other words in the case, like the illustrative case presently, where pressure pulses are present with frequencies of more than 100 kHz, it is possible for unfavorable conditions—highly chaotic conditions—to develop. For applications of this kind, preference is given to cross-sectional shapes of the opening with which fluctuations can be at least reduced, preferably minimized.

Figure 11A:
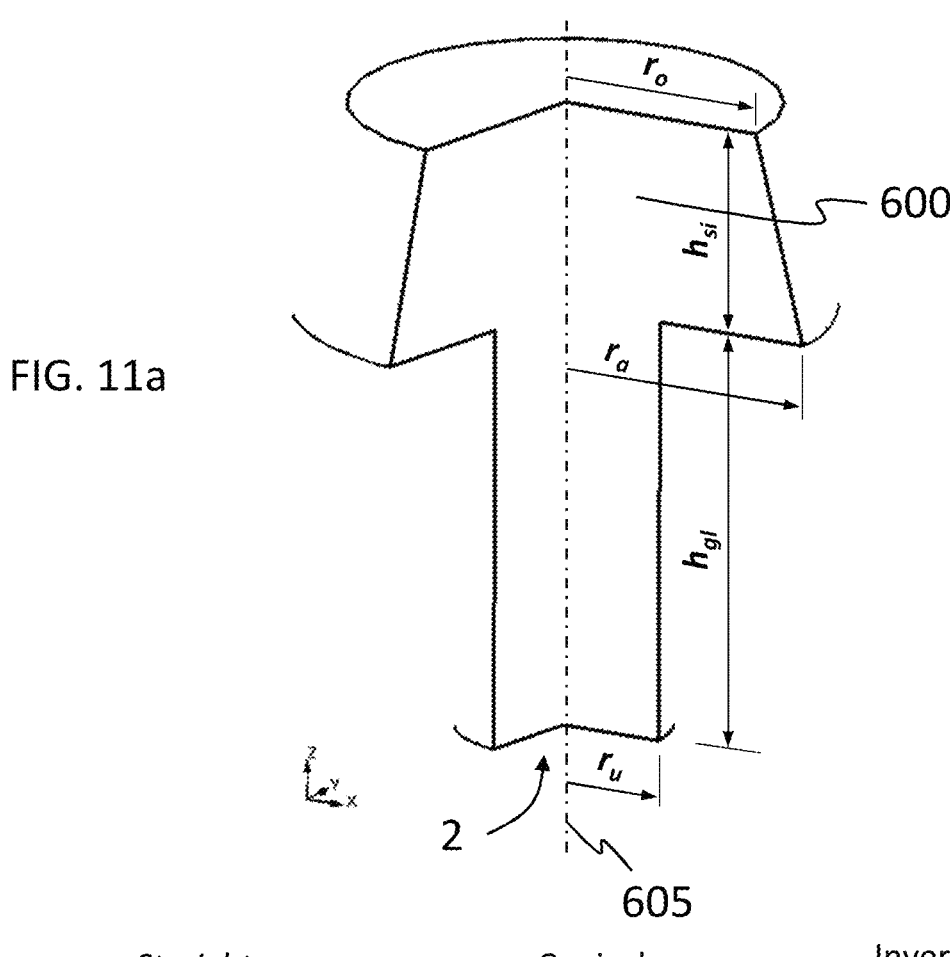
FIGS. 11*a*-11*d* and 12*a*-12*c* shows the behavior of pressure sensor with a round cross-sectional geometry to the opening and with differently configured angles of inclination of the sidewall with respect to the temporal distribution of a pressure pulse.

Shown in FIG. 11*a* is an illustrative representation of a measuring cavity 600 having the height $h_{si}$. The measuring cavity 600 here is formed, illustratively, in a rotationally symmetric way about the symmetry axis 605. In the upper region of the measuring cavity 600 it has a radius $r_o$. Here, therefore, illustratively, the measuring cavity 600 is designed in the form of a straight conical frustum, and so the lower radius $r_a$ of the measuring cavity is greater than $r_o$. Adjoining the measuring cavity 600 here, toward the bottom, is the region of the opening 2. The height $h_{gl}$ of the opening 2 corresponds to the thickness of the glass element, which here, however, is not represented. The opening 2 here is likewise formed rotationally symmetrically about the axis 605, and therefore has the shape of a cylinder with the radius $r_u$.

Figure 11B:
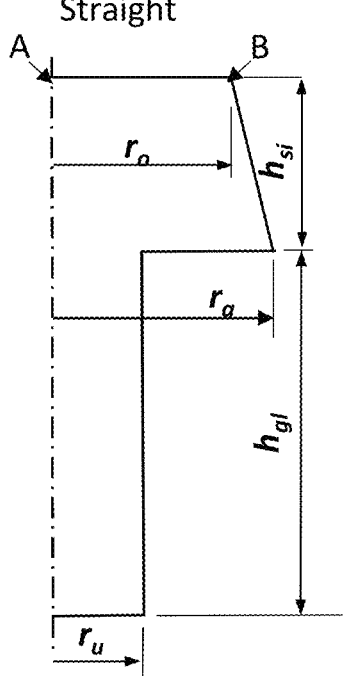
Figure 11C:
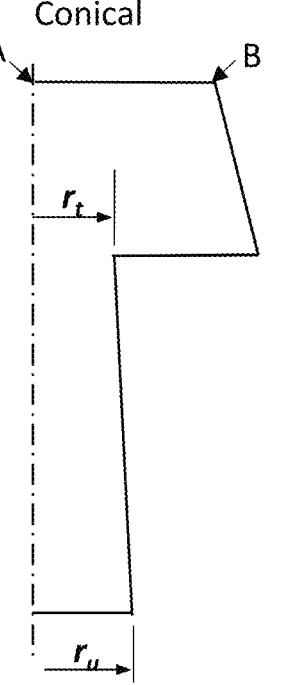
Figure 11D:
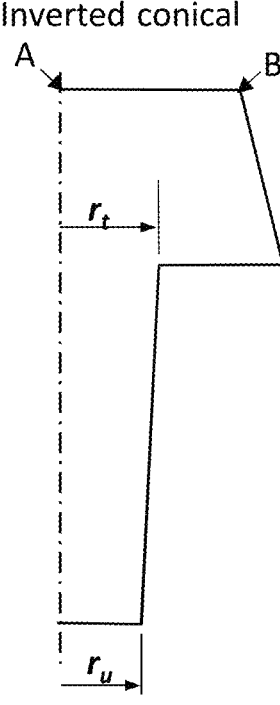
Figures 12A, 12B, 12C:
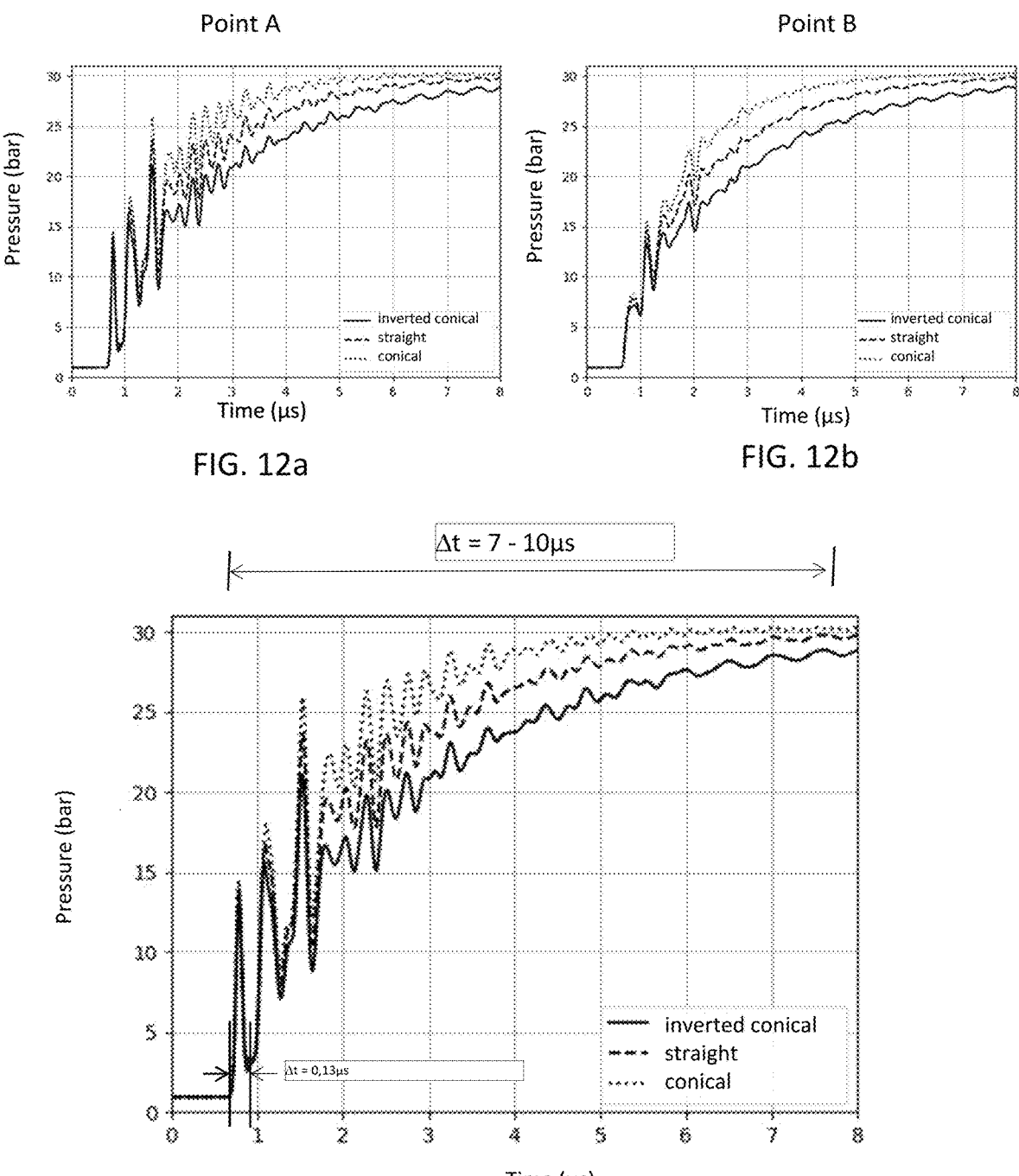

FIGS. 11*b*, 11*c*, and 11*d* differentiate three different cases of the configuration of the opening 2 (not labeled here).

FIG. 11*b* shows the case of the side faces not inclined, the dimensions valid are those as described above in relation to FIG. 11*a*. FIG. 11*b* is in the form of a schematic sectional representation and is labeled "straight".

FIG. 11*c* represents the case where the side face of the opening 2 (not labeled) is inclined in a form such that the radius $r_t$ of the cross-sectional area of the opening in the direction of the silicon membrane or of the measuring cavity (each not labeled) is smaller than the radius $r_u$. In other words, therefore, the cross-sectional area toward the measuring cavity is smaller than the cross-sectional area on the side of the glass element that faces away from the measuring cavity. Here and also below, this is referred to generally—for example, including for the case where the opening has a cross section with a cross-sectional area which is delimited by at least one linear portion, as "conical".

FIG. 11*d* is the converse case represented, in which $r_u$ is smaller than $r_t$. This is labeled here and below as inverted conical, including for the case of a cross-sectional area shape that deviates from the round shape, including, for example, in the case where the opening has a cross section with a cross-sectional area which is delimited by at least one straight portion. As already discussed above, it is apparent when looking at the calculations that in the case of a so-called "conical" embodiment of the opening, it is even possible, for example, for the time to achieve the maximum pressure at at least one point A, B of a silicon membrane comprised by the pressure sensor to be shorter by preferably at least 30%, more preferably indeed by at least 40%, than is achievable in the case of a constant or expanding cross-sectional area of the opening. An embodiment of this kind for a pressure sensor may be advantageous. However, the converse case of the "inverted conical" design may also be advantageous, since here the pressure fluctuations are lower.

Figures 13A, 13B, 13C, 13D:
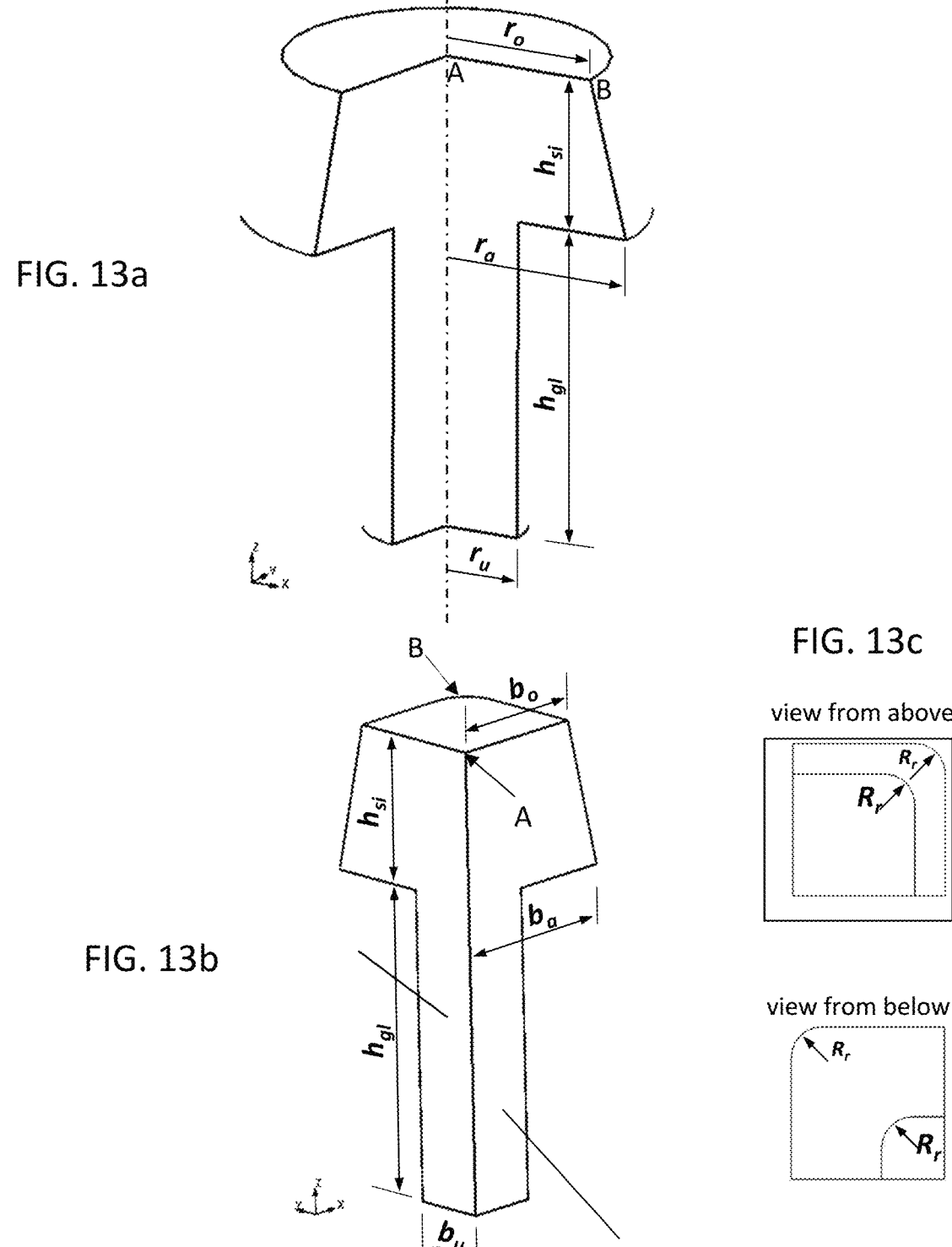
FIGS. 13*a*-13*d* and 14*a*-14*b* show the behavior of a pressure sensor with round cross-sectional form of the opening to square cross-sectional form of the opening in terms of the temporal distribution of a pressure pulse.
Figure 14A:
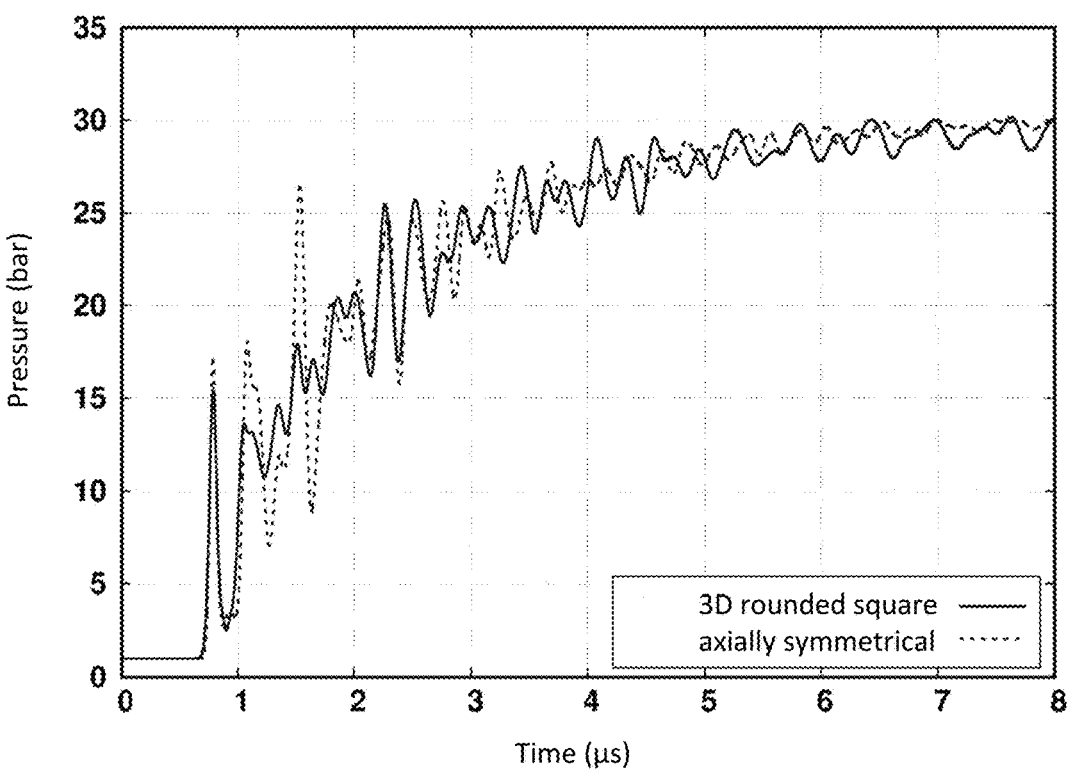
Figure 14B:
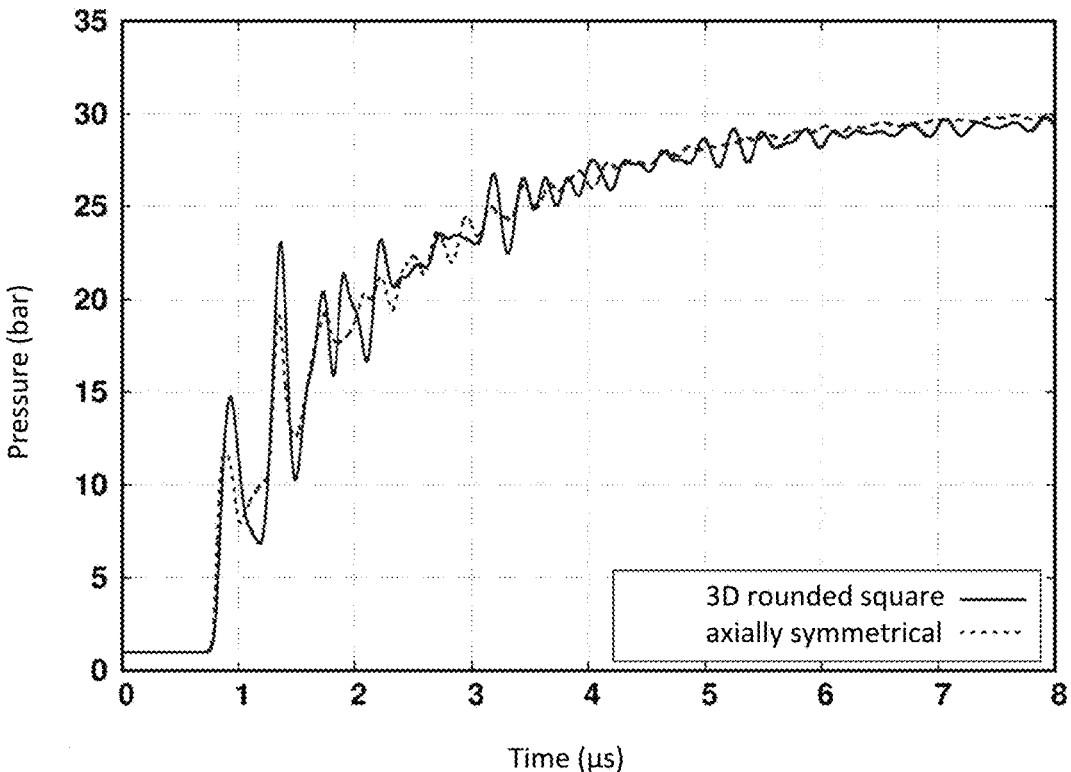

FIGS. 13*a*-13*d* and 14*a*-14*b* show simulations relating to the fluid dynamics of an opening with a round cross-sectional geometry, in comparison with an opening with angular cross-sectional geometry. Again, FIG. 13*a* shows the measuring cavity with round cross-sectional geometry, corresponding to FIG. 11*a*. FIG. 13*b*, conversely, is the case of an opening or a measuring cavity wherein the cross-sectional geometry differs from the round form, thus having a cross section with a cross-sectional area which is characterized by at least one straight portion, in this case four straight portions. The corners of the corresponding cross-sectional areas here are each rounded off, as apparent in FIG. 13*b*, illustratively, from FIGS. 13*c* and 13*d*. Because of the different cross-sectional shapes, only the corner radii Rr are labeled here, to characterize the rounding of the corners, but no radii otherwise; instead, the dimensions $b_a$ and $b_u$, or $b_o$, are labeled, which here are half the edge length of measuring cavity at the top ($b_o$), at the bottom (i.e., in the direction of the glass element) ($b_a$), and the opening of the glass element ($b_u$). The conditions in the simulation correspond here to those from explanations given in relation to FIGS. 11*a*-11*d* and 12*a*-12*c*. However, both the cavity in the silicon and the incoming-flow opening have not been made ideally round—in other words, they exhibit at least one straight edge or straight portion 31. In both models the flow cross sections are the same.

In analogy to the calculations in FIGS. 11*a*-11*d* and 12*a*-12*c*, the pressure equalization takes place within a time window of microseconds. The fluctuations here are lower at the margin of the cavity, point B, than in the center A, and this means that back-reflections are lower overall. An advantage of a nonangular opening is particularly apparent at point A: the high-frequency fluctuations are significantly attenuated—applications at high frequencies are as a result more reliable and can be monitored more precisely.

Also important in accordance with the invention, then, surprisingly, are not only geometric influences, i.e., cross-sectional geometries of openings, but also the surface morphology of the opening or of its sidewall or side face per se. Surprisingly it is possible to observe that nonsymmetric conditions/components between hills and valleys are able to positively counteract the aforementioned chaotic conditions. For example, structures which are not ideally smooth may lead to turbulent flow components, which, brought into harmony with, and/or balanced in a targeted way with geometrical effects, can produce an ideal pressure load on the sensor cavity or on the sensitive Si membrane in terms of pressure magnitude, saturation and fluctuation.

Figure 15A:
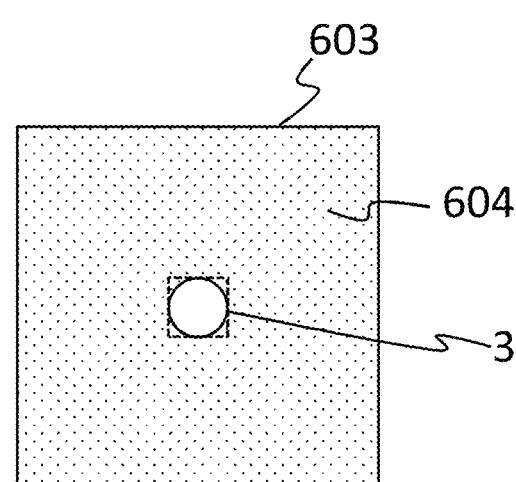
FIGS. 15*a* and 15*b* show illustrative representations relating to the different area ratios of the cross-sectional areas of cavity and opening.
Figure 15B:
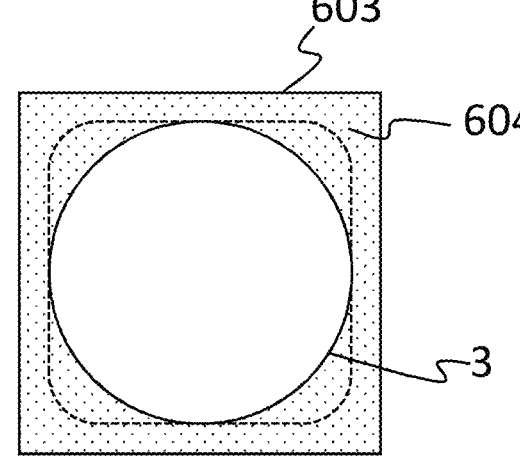

FIGS. 15*a* and 15*b*, schematically and not true to scale, shows the representation of cross-sectional areas 603 of measuring cavities 600 (in each case not labeled) and cross-sectional areas 3 and 3*a* of the glass element 100. FIG. 15*a* represents a plan view of a cross-sectional area 603 of the measuring cavity of a pressure sensor. Likewise, the cross-sectional area 3 of the opening 2 (the opening 2 has not been labeled), which in this case is disposed centrally. The round cross-sectional area 3 of the opening of the glass element is small here by comparison with the cross-sectional area 603 of the cavity. Additionally represented is the—hypothetically—angular cross-sectional area 3*a* of an opening 2 (again not labeled), which has an edge length corresponding to the diameter of the round opening 3. The difference between the cross-sectional areas 603 and 3 (or 603 and 3*a*) produces the resultant free area 604, i.e., the area on which a force can act in the case of subjection to pressure.

FIG. 15*b* shows a corresponding representation, albeit with the difference that in this case the resultant free area 604 is significantly smaller than in FIG. 15*a*. Here, in other words, the ratio of the two cross-sectional areas 603 and 3 (or 603 and 3*a*) to one another is significantly smaller than in the case of the representation in FIG. 15*a*. As already observed above, the influence of the advantageous configuration of an opening having at least one straight portion— that is, for example, an angular design of the opening or with rounded corners—is particularly strongly pronounced specifically for the case of FIG. 15b. The reason is that, as can be seen, in this case specifically the reduction in the resultant free area 604 is particularly efficient, as a result of the change from a round or circular cross section to a cross section which has at least one straight portion.

surface characterized by a skewness (Ssk) that is in the range of −5.0 to −0.001 or 0.001 to 5.0, the skewness (Ssk) being defined by:

$$Ssk = \frac{1}{S_q^3}\left[\frac{1}{A}\int\int_A (Z(x, y)^3)dxdy\right]$$

---

LIST OF REFERENCE SYMBOLS

| | |
|---|---|
| Sheetlike glass substrate | 1 |
| Glass wafer | 10 |
| Glass element | 100 |
| Surfaces | 11, 12 |
| Side of a triangle | 110 |
| Opening | 2 |
| Cross-sectional area | 3, 3a |
| Straight portion/straight edge | 31 |
| Straight line | 32 |
| Sidewall, side face | 4 |
| Surface of the sidewall | 41 |
| Region corresponding to straight portion | 431 |
| Thickness | 5 |
| Angle, angle of inclination | 51 |
| Angle, right angle | 52 |
| Pressure sensor | 6 |
| Pedestal | 60 |
| Silicon membranes | 61, 62 |
| Adhesive layer, adhesive | 63 |
| Measuring cavities | 600, 601 |
| Cross-sectional area of cavity | 603 |
| Resultant free area | 604 |
| Symmetry axis | 605 |
| Deformable membrane portion | 610 |
| Filamentary damage, filament | 70 |
| Continuous line, contour | 71 |
| Laser | 8 |
| Laser beam | 80 |
| Focusing optics | 81 |
| Impingement point | 82 |
| Positioning device | 9 |
| Computing device | 91 |
| A, B | Points on the silicon membrane |
| $h_{si}$ | Height of the silicon membrane |
| $h_{gl}$ | Height of the glass element |
| $r_u$ | Radius of the opening at the side facing away from the silicon membrane |
| $r_a$ | Radius of the measuring cavity on the side facing the glass element |
| $r_t$ | Radius of the opening on the side facing the measuring cavity |
| $r_o$ | Radius of the measuring cavity on the side facing away from the glass element |
| $b_u$ | Half dimension of the opening on the side facing away from the silicon membrane |
| $b_a$ | Half dimension of the measuring cavity on the side facing the glass element |
| $b_o$ | Half dimension of the measuring cavity on the side facing away from the glass element |
| $R_r$ | Radius of the corner |

---

What is claimed is:

1. A glass wafer comprising:

a sheetlike glass substrate configured for use in a sensor selected from a group consisting of a pressure sensor, a piezoresistive sensor, a capacitive pressure sensor, and a piezoresistive pressure sensor; and an opening defined in the glass substrate through a thickness of the glass substrate from a first surface to a second, opposite surface, the opening has a cross-sectional area that is delimited by a straight portion along the thickness that has a minimum length of at least 10 um and a side face with a wherein $S_q$ denotes a mean square roughness in millimeters squared (mm²) of the surface, A is an area in millimeters squared (mm²) of an integration zone of which the skewness is determined, Z(x,y) is a height value in millimeters (mm) of the surface at coordinates x, y, the height value being expressed relative to an arithmetic mean of height values of the surface, and Z(x,y) is positive if a point on the surface is higher than a mean, and negative if the point is below the mean.

2. The glass wafer of claim 1, wherein the skewness (Ssk) is greater than 0.

3. The glass wafer of claim 1, wherein the skewness (Ssk) is less than 0.

4. The glass wafer of claim 1, wherein the skewness (Ssk) is at least 0.01 and at most 1.5.

5. The glass wafer of claim 1, wherein the skewness (Ssk) is determined in a planar region of the side face and in a region that corresponds to the straight portion.

6. The glass wafer of claim 1, wherein the cross-sectional area is delimited by at least two straight portions forming a corner with a radius curvature of at least 10 µm and at most 1000 µm.

7. The glass wafer of claim 1, wherein the glass substrate comprises a glass with at least 50 wt % and at most 85 wt % of $SiO_2$.

8. The glass wafer of claim 1, wherein the glass substrate comprises a glass with at least 1.5 wt % and most 15 wt % of $B_2O_3$.

9. The glass wafer of claim 1, wherein the glass substrate comprises a glass with at least 2 wt % at most 25 wt % of $Al_2O_3$.

10. The glass wafer of claim 1, wherein the cross-sectional area has a mean superficial extent of between at least 0.04 $mm^2$ and at most 2.7 $mm^2$.

11. The glass wafer of claim 1, further comprising an additional opening with a land width between the opening and the additional opening that is at least 0.3 mm and at most 7 mm.

12. The glass wafer of claim 1, further comprising an additional opening with a land width between the opening and the additional opening that is at least 0.5 mm and at most 5 mm.

13. The glass wafer of claim 1, further comprising a ratio between the opening and a total area of the glass wafer between 0.1% and 12%.

14. The glass wafer of claim 1, wherein the thickness is between at least 200 µm and at most 3500 µm and a ratio between the thickness and a mean lateral dimension of the opening between at least 0.33 and at most 3.

15. The glass wafer of claim 1, wherein glass substrate has a thickness variation of less than 10 µm.

16. The glass wafer of claim 1, wherein glass substrate has a thickness variation of less than 1 µm.

17. The glass wafer of claim 1, wherein the opening has a side face with an angle of inclination of at most 2°, the angle of inclination here being a deviation from an ideally straight-line side face that forms an angle of 90° for the first and second surfaces.

18. The glass wafer of claim 1, further comprising a silicon membrane joined to the first or second surface over the opening.

19. The glass wafer of claim 18, wherein the silicon membrane and the opening have aspect ratios that are the same.

20. A pressure sensor comprising the glass wafer of claim 18.

* * * * *